US011127937B2

United States Patent
Kim

(10) Patent No.: US 11,127,937 B2
(45) Date of Patent: Sep. 21, 2021

(54) METHOD OF MANUFACTURING CARBON-COATED ELECTRODE ACTIVE MATERIAL AND ELECTRODE ACTIVE MATERIAL MANUFACTURED BY THE METHOD

(71) Applicant: RESEARCH & BUSINESS FOUNDATION SUNGKYUNKWAN UNIVERSITY, Suwon-si (KR)

(72) Inventor: Jaehoon Kim, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1179 days.

(21) Appl. No.: 14/951,918

(22) Filed: Nov. 25, 2015

(65) Prior Publication Data
US 2017/0149061 A1    May 25, 2017

(51) Int. Cl.
| H01M 4/04 | (2006.01) |
| H01M 10/0525 | (2010.01) |
| H01M 4/58 | (2010.01) |
| H01M 4/36 | (2006.01) |
| H01M 4/485 | (2010.01) |
| H01M 4/62 | (2006.01) |

(52) U.S. Cl.
CPC ......... *H01M 4/0471* (2013.01); *H01M 4/366* (2013.01); *H01M 4/485* (2013.01); *H01M 4/5825* (2013.01); *H01M 4/625* (2013.01); *H01M 10/0525* (2013.01)

(58) Field of Classification Search
None
See application file for complete search history.

(56) References Cited

U.S. PATENT DOCUMENTS

| 2010/0154880 A1* | 6/2010 | Lai | H01G 9/2031 |
| | | | 136/256 |
| 2010/0269894 A1* | 10/2010 | Misra | B82Y 20/00 |
| | | | 136/252 |
| 2011/0303269 A1* | 12/2011 | Kim | H01G 9/2031 |
| | | | 136/255 |

FOREIGN PATENT DOCUMENTS

CN    101217171 A    * 7/2008

OTHER PUBLICATIONS

Li et al., CN 101217171 A—Abstract translation.*

* cited by examiner

*Primary Examiner* — Haixia Zhang
(74) *Attorney, Agent, or Firm* — NSIP Law

(57) ABSTRACT

Disclosed is a method of carbon-coating a secondary battery active material and a second battery active material produced by the method. The method of producing a carbon-coated battery active material involves mixing a carbon precursor with liquid carbon dioxide to produce a coating solution comprising a carbon material, coating a battery active material with the carbon material by applying the coating solution to the battery active material, and sintering the coated battery active material to obtain the carbon-coated battery active material.

16 Claims, 19 Drawing Sheets

METHOD OF MANUFACTURING CARBON-COATED ELECTRODE ACTIVE MATERIAL AND ELECTRODE ACTIVE MATERIAL MANUFACTURED BY THE METHOD

BACKGROUND

1. Field

The following description relates to a method of uniformly coating a surface of a secondary battery active material with a carbon layer, and a secondary battery active material manufactured thereby.

2. Discussion of Related Art

Recently, in order to reduce dependence on petroleum and fundamentally reduce greenhouse gases such as carbon dioxide, eco-friendly plug-in hybrid electric vehicles (PHEVs), electric vehicles (EV), and energy storage systems (ESS) using lithium secondary batteries as energy sources have been competitively developed. In addition, it is expected that demands for medium-sized and large-sized secondary batteries will significantly increase in various fields, such as robots, backup power, medical equipment, and the like. Accordingly, research and development related thereto are being actively executed. As the demand for high capacity batteries increases, evaluation of a high energy density, a high capacity, and safety becomes important factors to consider in manufacturing batteries.

Currently, lithium composite metal oxides, such as lithium cobalt oxide ($LiCoO_2$), lithium manganese oxide ($LiMn_2O_4$), and lithium nickel oxide ($LiNiO_2$) are widely used as a material for a positive electrode of a secondary battery. Although $LiCoO_2$ has excellent high voltage and charge/discharge characteristics and is most widely used as a positive electrode active material, $LiCoO_2$ is not a suitable positive electrode material of a large-sized secondary battery for PHEVs or power storages due to high manufacturing cost since cobalt (Co), a raw material thereof, is rare, geographically concentrated, and expensive, and due to safety problems since cobalt (Co) is toxic and causes environmental pollution when discharged to outside and is unstable with respect to temperature and causes explosion at high temperature. Accordingly, in order to resolve such issues, studies on fabrication of a positive electrode active material represented by a formula of $LiMn_2O_4$ or $LiNiO_2$ containing manganese (Mn) or nickel (Ni), which have relatively abundant reserves, have been conducted. However, in the case of $LiMn_2O_4$, a stability problem since Mn is dissolved in an electrolyte, and a short lifespan problem since deterioration thereof progresses at high temperature exists, and in the case of $LiNiO_2$, problems of battery capacity seriously being degraded during a charging and discharging process since a crystal structure thereof collapses and of low thermal stability exist. Accordingly, in order to achieve large-sized and mass production of lithium secondary batteries, demand for a novel positive electrode active material that achieves high performance and provides high safety and high reliability is being increased.

Meanwhile, a variety of carbon-based negative electrode active materials, such as artificial graphite, natural graphite, hard carbon, or soft carbon, are widely used as materials of negative electrodes of lithium secondary batteries. The use of a carbon-based negative electrode active material is characterized by various positive qualities, such as a similar operation voltage to metallic lithium, structural stability, excellent reversible cycling performance for a long time. However, the practical application of a carbon-based negative electrode active material poses a challenge in that a battery formed thereof has a low energy density per unit volume due to a low density of a carbon-based material. In addition, since an oxidation/reduction potential of the carbon-based negative electrode active material is lower than a potential of $Li/Li^+$ by about 0.1 V, decomposition may occur due to a reaction with an organic electrolyte used for fabricating a battery, a solid electrolyte interface (SEI) film can form on a surface of carbon-based material due to a reaction with lithium, and thereby charging/discharging characteristics may be degraded. In particular, in an application requiring high rate capability, such as the EV, since resistance increases during insertion/elimination of lithium due to the formation of the SEI film, a problem of the high rate capability deteriorating may exist. Further, the carbon-based negative electrode active material imposes a safety concern in that lithium having extremely strong reactivity is precipitated on a surface of a negative electrode during high rate charging/discharging operations and reacts with an electrolyte and a positive electrode material, potentially resulting in an explosion.

Accordingly, in order to achieve mass production of large-sized lithium secondary batteries, a demand exists to develop a novel cathode active material and anode active material that achieves high performance and provides safety and reliability. Recently, various types of cathode active materials including phosphate-based material having a formula of olivine-structured $LiMPO_4$ (M is Mn, Fe, Co, or Ni) which provides high performance, safety, and reliability, and silicate-based $Li_2NSiO_4$ (N is Fe or Mn), and anode active material including a lithium titanium oxide (LTO) having a formula of spinel-structured $Li_4Ti_5O_{12}$, and anatase-type $TiO_2$, are attracting much attention as potential active materials of such medium and large-sized secondary batteries.

The cathode electrode active material formed of olivine-structured $LiMPO_4$ (M is Mn, Fe, Co, or Ni) or silicate-based $Li_2NSiO_4$ (N is Fe or Mn) has many advantages, compared to existing $LiCoO_2$. When M and N are Fe ($LiFePO_4$ and $Li_2FeSiO_4$), there are positive qualities, such as extremely low material price compared to $LiCoO_2$ due to abundant reserves and a low cost of Fe, low-toxicity and eco-friendly characteristics, and extremely low risk of explosion at high temperature due to structural stability. In addition, since theoretical output densities thereof are relatively high, that is, 170 mAh/g ($LiFePO_4$) and 330 mAh/g ($Li_2FeSiO_4$), battery capacity per unit mass may be increased. However, compared to the existing $LiCoO_2$, the $LiFePO_4$ and $Li_2FeSiO_4$ cathode active material may not satisfy electrochemical properties required for the cathode active material of lithium secondary batteries. This is because only lithium ions disposed on surfaces of particles are used and lithium ions disposed in center portions of particles are not used since insertion/elimination of lithium ions during charging and discharging is extremely slow and a diffusion rate of lithium ions in the cathode active material is very low. In addition, battery performance may significantly deteriorate due to an overvoltage phenomenon occurring during high rate charging/discharging operations since electrical conductivity of the cathode active material is very low.

Meanwhile, in the cases of LTO and $TiO_2$, since oxidation/reduction potentials thereof are in the range of 1.5 to 1.7 V, that is, higher than a potential of $Li/Li^+$, there is little possibility of decomposition of an electrolytic solution and consequential formation of an SEI film, which occurs as a problem in the carbon-based anode active material.

In addition, due to the high oxidation/reduction potentials, there is little possibility of precipitation of metallic form lithium. The precipitation of metallic form lithium generates a problem during high rate charging/discharging operations of the carbon-based anode active material. Accordingly, LTO and $TiO_2$ may be extremely safe during the high rate charging/discharging operations and may be utilized as power sources of PHEVs, EVs, ESSs, power tools, or uninterruptible power supplies. In addition, theoretical densities are about 3.48 $g/cm^3$ (LTO) and 4.23 $g/cm^3$ ($TiO_2$), which are much higher than that of the carbon-based negative electrode active material. Accordingly, LTO and $TiO_2$ are spotlighted as a novel anode active material of large-sized secondary batteries, such as in the EVs or the ESSs, due to high safety, excellent high-rate charging/discharging characteristics, and high reliability thereof.

However, since LTO and $TiO_2$ have very low electrical conductivity ($10^{-13}$ S $cm^{-1}$) and lithium-ion conductivity, an insertion/elimination rate of lithium ions during charging and discharging is extremely low when micron-sized LTO and $TiO_2$ particles (10 to 100 μm; a Brunauer-Emmett-Teller (BET) specific surface area of 2-5 $m^2$/g) are used. Accordingly, charge/discharge capacities of LTO and $TiO_2$ are only about 70% of their theoretical capacities, and the LTO and $TiO_2$ have not been widely used as the anode active material of lithium secondary batteries.

Currently known technologies for increasing electrical conductivity by adding a conductive material to $LiMPO_4$ (M is Mn, Fe, Co or Ni), $Li_2NSiO_4$ (N is Fe or Mn), LTO, or $TiO_2$, may be classified into a technology of adding carbon having excellent conductivity by a solid-phase method before formation of particles, a technology of coating a surface of a synthesized active material with a carbon precursor (sugar, cellulose, citric acid, or the like) by a liquid-phase method, such as a hydrothermal method, an emulsion method, or a sol-gel method, a technology of coating active material particles with carbon using a vapor-phase method, such as a chemical vapor deposition (CVD) method or a spray pyrolysis. However, when the active material is coated with carbon obtained by the above-described methods, the uniformity of the carbon coating the active material is very low. Accordingly, it is inevitable to add an excess of carbon to increase electrical conductivity of the active material. Since a density of carbon is significantly lower than a density of the active material, there is a problem in that an energy density per unit volume of the battery may be significantly lowered when an electrode is formed of the active material coated with carbon by the above-described methods. In addition, waste solution and waste organic solvent may be excessively generated as a byproduct, resulting in environmental pollution when the liquid-phase method is used. Accordingly, it is necessary to develop a carbon coating method that enables a secondary battery active material to have excellent electrochemical properties by coating a lithium secondary battery active material with a uniform carbon layer having a nano-scale thickness thereby improving electrical conductivity of the entirety of the active material particles and have excellent energy density per unit volume by minimizing carbon particles which do not coat the active material particles, and enables a simplification of a waste water and waste chemical material treatment process by using an eco-friendly method.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of producing a carbon-coated secondary battery active material involves forming a coating solution comprising a carbon precursor dissolved in liquid carbon dioxide, coating a surface of a secondary battery active material with the carbon precursor by immersing the secondary battery active material in the coating solution, and sintering the secondary battery active material coated with the carbon precursor.

The general aspect of the method may further involve removing the liquid carbon dioxide after coating the secondary battery active material with the carbon precursor and before sintering the secondary battery active material coated with the carbon precursor.

The carbon precursor may include at least one selected from the group consisting of sucrose octaacetate, fluorinated hydrocarbons, polyethylene glycol, acrylic acid, methacrylic acid, acrylamide, vinyl pyrrolidone, glycidyl methacrylate, and styrene.

The carbon precursor may include at least one functional group selected from the group consisting of a carboxyl group, a hydroxyl group, an epoxy group, an ester group, a thiol group, and a sulfonic group.

A concentration of the carbon precursor in the coating solution may be in the range of 5 to 40 wt %.

The coating solution may be produced at a temperature of 0 to 30° C. under a pressure of 30 to 200 bar.

The coating of the secondary battery active material may be performed under a pressure of 30 to 200 bar.

The sintering of the secondary battery active material may be performed at a temperature of 200 to 800° C. for 1 to 3 hours.

The sintering of the secondary battery active material may be performed in an atmosphere comprising one or more gases selected from the group consisting of hydrogen, helium, neon, argon, krypton, xenon, and radon.

The sintering of the secondary battery active material may be performed in an atmosphere comprising a hydrocarbon gas.

The secondary battery active material may include at least one selected from the group consisting of titanium dioxide, a compound represented by Formula 1, a compound represented by Formula 2, and a compound represented by Formula 3, wherein:

$LiMPO_4$                                 [Formula 1]

(wherein M is one of manganese (Mn), iron (Fe), cobalt (Co), and nickel (Ni))

$Li_2NSiO_4$                                [Formula 2]

(wherein N is iron (Fe) or manganese (Mn))

$Li_4Ti_5O_{12}$.                                [Formula 3]

The secondary battery active material before sintering may include at least one amorphous portion, and the amorphous portion may be changed to a crystalline portion during the sintering of the secondary battery active material.

In another general aspect, there is provided a secondary battery active material including a carbon coating layer coating a surface thereof, wherein a weight ratio of the carbon coating layer with respect to a total weight is 1.6 to 5 wt %.

In another general aspect, a method of producing a carbon-coated battery active material involves mixing a carbon precursor with liquid carbon dioxide to produce a coating solution comprising a carbon material, coating a battery active material with the carbon material by applying the coating solution to the battery active material, and sintering the coated battery active material to obtain the carbon-coated battery active material.

The carbon precursor may include at least one selected from the group consisting of sucrose octaacetate, fluorinated hydrocarbons, polyethylene glycol, acrylic acid, methacrylic acid, acrylamide, vinyl pyrrolidone, glycidyl methacrylate, and styrene.

The secondary battery active material may include particles with an average diameter between 10 to 100 μm, the particles including at least one selected from the group consisting of titanium dioxide or a lithium composite metal oxide including manganese, iron, cobalt, nickel or titanium.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, a method of carbon-coating a secondary battery active material using liquid carbon dioxide according to various examples and a secondary battery active material coated with carbon by the method will be described in detail with reference to accompanying drawings.

The same reference numbers will be used throughout this specification to refer to the same or like components. Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
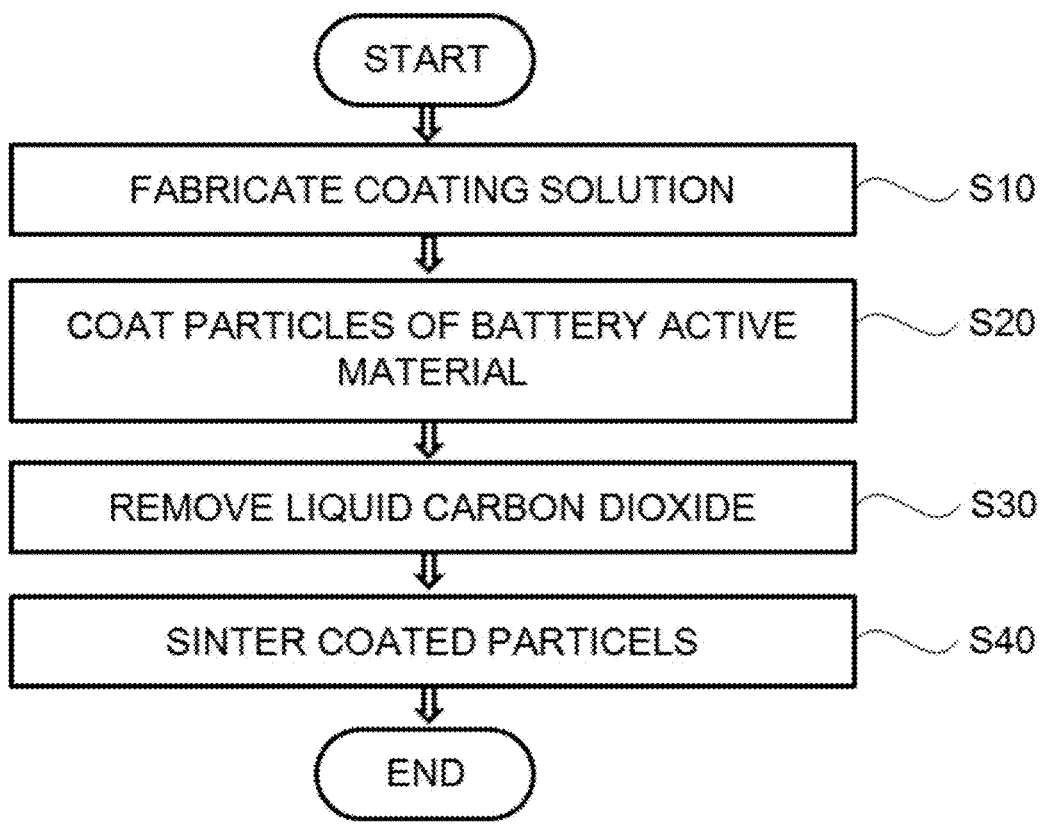
FIG. 1 is a flowchart illustrating an example of a method of carbon-coating a secondary battery active material using liquid carbon dioxide.

FIG. 1 illustrates an example of a method of carbon-coating a secondary battery active material using liquid carbon dioxide.

Referring to FIG. 1, the method of carbon-coating the secondary battery active material using liquid carbon dioxide involves a process of fabricating a coating solution (S10), a coating process (S20), a process of removing liquid carbon dioxide (S30), and a sintering process (S40).

In the process of fabricating a coating solution (S10), carbon precursors are dissolved in liquid carbon dioxide to fabricate the coating solution. In some embodiments, carbon precursors formed of an organic material are introduced to a high-pressure solution vessel, then liquid carbon dioxide is added thereto. With the formation of a mixture of the liquid carbon dioxide and the carbon precursors, the carbon precursors are dissolved in the liquid carbon dioxide to form the coating solution.

As the carbon precursors, any organic material containing carbon may be used without limitation. In some embodiments, as the carbon precursors, one or more selected from the group consisting of sucrose octaacetate, fluorinated hydrocarbons, polyethylene glycol, acrylic acid, methacrylic acid, acrylamide, vinyl pyrrolidone, glycidyl methacrylate, and styrene may be used.

In some embodiments, the carbon precursors may include a functional group having a high degree of affinity with respect to a metal included in active material particles. For example, the carbon precursors may include at least one functional group selected from the group consisting of a carboxyl group, a hydroxyl group, an epoxy group, an ester group, a thiol group, and a sulfonic group. When the carbon precursors include at least one functional group having the high degree of affinity with respect to a metal, the carbon precursors may be bonded to surfaces of the active material particles. Accordingly, even when the active material particles are exposed to the carbon precursors for a short period of time, the surfaces of the active material particles may be uniformly coated with the carbon precursors.

A viscosity of liquid carbon dioxide may be about 0.1 centipoise (cp) at room temperature, which is significantly lower than a viscosity of a normal organic solvent or water, which is about 0.5 to 1.5 cp. A surface tension of liquid carbon dioxide may be 5 dyne/cm or lower at room temperature, which is significantly lower than a surface tension of the normal organic solvent, which is about 25 to 30 dyne/cm, or a surface tension of water, which is about 72 dyne/cm. Due to the properties such as low viscosity and low surface tension, liquid carbon dioxide may easily penetrate into micro-pores existing between the nano-sized active material particles. Conversely, since most organic solvents or water have high surface tension and high viscosity, penetration into micro-pores existing between the nano-sized active material particles is difficult. In addition, liquid carbon dioxide is a liquid capable of dissolving the carbon precursor organic material. Since liquid carbon dioxide has a high density of about 0.7 g/cm³ to about 0.8 g/cm³ at room temperature, it has high solubility with respect to various kinds of carbon precursor organic materials.

Accordingly, when the carbon precursors are dissolved in liquid carbon dioxide to coat the surfaces of the nano-sized active material particles, as compared to when the carbon precursors are dissolved in an organic solvent or water to coat the surfaces of the nano-sized active material particles, the surfaces of the nano-sized active material particles may be uniformly coated with the carbon precursors. In addition, liquid carbon dioxide may be, unlike water or the organic solvent, recovered and drained by reducing pressure after the coating process. Accordingly, since a waste liquid treatment process after the coating process can be omitted, the method of coating a secondary battery active material with carbon using liquid carbon dioxide according to the example may be an economical and environmental friendly method.

In the coating solution, a concentration of the carbon precursors may be in the range of 1 to 80 wt %. When the concentration of the carbon precursors is less than 1 wt %, the amount of carbon precursors is too small to uniformly coat the surfaces of the active material particles of the secondary battery. When the concentration of the carbon precursors is more than 80 wt %, the viscosity of the carbon precursors is too high to penetrate into micro-pores of the secondary battery active material. In some embodiments, the concentration of the carbon precursors in the coating solution may be in the range of 5 wt % to 40 wt %. In another embodiment, the concentration of the carbon precursors in the coating solution may be in the range of 25 wt % to 35 wt %.

The coating solution may be fabricated at a temperature of 0° C. to 30° C. under a pressure of 30 to 200 bar. In some embodiments, the coating solution may be, for example, produced at a temperature of 5° C. to 25° C. under a pressure of 50 to 100 bar. When the coating solution is fabricated at a temperature under 0° C., an additional cooling process may be required to maintain a low temperature, which could be uneconomical. When the coating solution is fabricated at a pressure under 30 bar, there is a problem in that solubility of the carbon precursors with respect to liquid carbon dioxide decreases and carbon coating is not uniform. In addition, when the coating solution is fabricated at a temperature higher than 30° C. under a pressure higher than 100 bars, additional costs for maintaining the high temperature and the high pressure may be generated, and process reliability may be decreased.

In the coating process (S20), the surface of secondary battery active material may be coated with the carbon precursors. In some embodiments, the surface of the secondary battery active material may be coated with the carbon precursors by introducing the secondary battery active material in a coating vessel, adjusting a pressure in the coating vessel to be the same as the pressure of the solution vessel, and introducing the coating solution into the coating vessel. Since the secondary battery active material particles are coated with the precursor using the coating solution in which carbon is dissolved in liquid carbon dioxide as described above, the coating solution may be penetrated into micro-pores disposed between the secondary battery active material particles and, as a result, the surface of the secondary battery active material is uniformly coated with the carbon precursors.

As the secondary battery active material, any material that can be used as an active material in the secondary battery may be used without limitation. In some embodiments, one selected from titanium dioxide ($TiO_2$) or compounds represented by the following Formula 1 to Formula 3, may be used as the secondary battery active material.

$LiMPO_4$ [Formula 1]

Here, M represents one of manganese (Mn), iron (Fe), cobalt (Co), and nickel (Ni).

$Li_2NSiO_4$ [Formula 2]

Here, N represents iron (Fe) or manganese (Mn).

$Li_4Ti_5O_{12}$ [Formula 3]

The coating process (S20) may be performed under the same pressure as the process of fabricating the coating solution (S10). In some embodiments, the coating solution may be introduced into the coating vessel after adjusting the pressure in the coating vessel to be the same as the pressure of the solution vessel by gradually introducing a carbon dioxide gas into the coating vessel accommodating the secondary battery active material.

The coating process (S20) may be performed for 10 minutes to 48 hours, or 30 minutes to 24 hours, for example. When the coating process (S20) is performed for less than 10 minutes, the secondary battery active material may not be uniformed coated with the carbon precursors since a contact time between the secondary battery active material and the carbon precursors is short. When the coating process (S20) is performed for more than 48 hours, the productivity may be deteriorated since a long period of contact between the secondary battery active material and the carbon precursors needs to be maintained.

After the coating process (S20), a process of separating the secondary battery active material coated with the carbon precursors from the carbon precursors that are not coated on the surface of the secondary battery active material but remaining in the liquid carbon dioxide phase may be further included. The process may be performed by transferring the liquid carbon dioxide solution to another high-pressure vessel by using a high-pressure pump, and lowering the vessel pressure.

The process of removing the liquid carbon dioxide (S30) may be a process of removing the liquid carbon dioxide, which is a coating solvent, and thereby obtaining the secondary battery active material coated with the carbon precursors.

In order to remove the liquid carbon dioxide, the liquid carbon dioxide may be vaporized by gradually lowering a pressure of the vessel in which the liquid carbon dioxide and the secondary battery active material are mixed to atmospheric pressure. According to the present embodiment, since liquid carbon dioxide is removed by vaporization thereof, the solvent may be environmentally friendly and easily removed.

In the sintering process (S40), the carbon precursors may be transformed to carbon. More specifically, the carbon precursors coating the surface of the secondary battery active material may be transformed to carbon by a heat treatment.

In some embodiments, the sintering process (S40) may be performed at a temperature of 200° C. to 800° C., or in the range of 500° C. to 600° C. When the sintering temperature is lower than 200° C., the carbon precursors may not be fully sintered. When the sintering temperature is higher than 800° C., particle sizes may increase due to agglomeration of the secondary battery active material and costs for sintering may increase due to maintenance of the high temperature.

Meanwhile, the sintering process (S40) may be performed for 30 minutes to 5 hours, or for 1 hour to 3 hours. When the sintering time is less than 30 minutes, there is a problem in that the carbon precursors may not be fully sintered. When the sintering time is longer than 5 hours, particle sizes may increase due to agglomeration of the secondary battery active material and costs for sintering may increase due to maintenance of the high temperature.

In some embodiments, the sintering process (S40) may be performed in a gas atmosphere of at least one of hydrogen, helium, neon, argon, krypton, xenon, and radon. For example, the sintering process (S40) may be performed in a hydrogen atmosphere.

In addition, the sintering process (S40) may be performed in an atmosphere in which a hydrocarbon gas is present in addition to the above-described gas. In this manner, when the sintering process (S40) is performed in the atmosphere including the hydrocarbon gas, hydrocarbon may be decomposed by the heat treatment to supply carbon to the surface of the secondary battery active material. Accordingly, a carbon coating layer may be formed in a wider area on the surface of the secondary battery active material.

Meanwhile, in this example, crystallized active material particles may be used as the secondary battery active material. In another example, active material particles, at least one portion of which is amorphous, may be used as the secondary battery active material. In this case, the amorphous portion may be crystallized by controlling the sintering temperature and time.

According to the method of carbon-coating the secondary battery active material using the liquid carbon dioxide, a uniform carbon coating layer may be formed on the surface of the secondary battery active material. In some embodiments, a weight ratio of carbon forming the carbon coating layer with respect to the total weight of the secondary battery active material coated with carbon may be about 1.6 to 5 wt %. When the carbon weight ratio is less than 1.6 wt % or more than 5 wt %, charge/discharge capacity may not only be small but also be rapidly decreased as charging-discharging cycles proceed.

The secondary battery active material coated with carbon fabricated in this manner may be used to manufacture an electrode for a secondary battery and the secondary battery including the electrode.

Hereinafter, various examples are shown and described; however, the present description should not be construed as limited to the examples set forth herein.

Particle Characteristic Analysis of Secondary Battery Active Material Coated with Carbon Embodiment 1

As a secondary battery active material, 2 grams of $LiFePO_4$ particles prepared by a solid-phase method were contained in a mesh and introduced in a high-pressure coating vessel. Then, a housing system including the high-pressure coating vessel was adjusted to be at a temperature of 15° C. by using a temperature controller, and a gaseous carbon dioxide was introduced into the high-pressure coating vessel to control a pressure in the high-pressure coating vessel to be 52 bar. As carbon precursors, sucrose octaacetate was introduced into a high-pressure solution vessel. Then, liquid carbon dioxide was introduced to the solution vessel to prepare a coating solution having a concentration of about 33 wt %.

The coating solution was transferred from the high-pressure solution vessel to the high-pressure coating vessel using a high-pressure pump. In order for the coating solution to be sufficiently adsorbed to the $LiFePO_4$ particles, the $LiFePO_4$ particles were immersed in the coating solution for 30 minutes.

Next, the liquid carbon dioxide solution in the coating vessel was transferred back into the high pressure solution vessel. Here, the $LiFePO_4$ particles are coated with the sucrose octaacetate by free meniscus generated during the solution drainage. Gaseous carbon dioxide remaining in the high-pressure coating vessel was gradually evacuated at a rate of 15 ml/min by opening a flow-control valve, and the $LiFePO_4$ particles coated with sucrose octaacetate were collected.

Next, the $LiFePO_4$ particles coated with sucrose octaacetate were heated to 600° C. at a rate of 5° C./min while flowing a high purity (99.999%) argon gas containing 5% hydrogen, and maintained for 3 hours. Thereby, carbon layers were formed on surfaces of the $LiFePO_4$ particles.

Embodiment 2

$Li_4Ti_5O_{12}$ coated with a carbon layer was fabricated using the same process as in Embodiment 1, except that $Li_4Ti_5O_{12}$ was used as the secondary battery active material.

Embodiment 3

TiO$_2$ coated with a carbon layer was fabricated using the same process as in Embodiment 1, except that TiO$_2$ was used as the secondary battery active material.

Embodiment 4

Li$_2$FeSiO$_4$ coated with a carbon layer was fabricated using the same process as in Embodiment 1, except that Li$_2$FeSiO$_4$ was used as the secondary battery active material.

Comparative Example 1

Sucrose having a concentration of 12 wt % was dissolved in thrice distilled water, and LiFePO$_4$ particles were introduced in the sucrose solution and thoroughly mixed. Slurry formed in this manner was dried in a vacuum oven at a temperature of 80° C. until moisture was removed. The dried particles were finely ground using a mortar and pestle, and sieved through a sieve with 20 µm diameter. The sieved particles were heated to 600° C. at a rate of 5° C./min while flowing a high purity (99.99%) argon gas containing 5% hydrogen, and maintained for 3 hours, to form a carbon layer.

Comparative Example 2

Li$_4$Ti$_5$O$_{12}$ coated with a carbon layer was fabricated using the same process as in Comparative Example 1, except that Li$_4$Ti$_5$O$_{12}$ was used as the secondary battery active material.

Comparative Example 3

TiO$_2$ coated with a carbon layer was fabricated using the same process as in Comparative Example 1, except that TiO$_2$ was used as the secondary battery active material.

Comparative Example 4

Li$_2$FeSiO$_4$ coated with a carbon layer was fabricated using the same process as in Comparative Example 1, except that Li$_2$FeSiO$_4$ was used as the secondary battery active material.

Experimental Example

In order to analyze a phase state of the secondary battery active material particles fabricated by the method according to an embodiment of the present description, a Hitachi scanning electron microscopy (SEM) was used. A Rigaku X-ray diffractometer (XRD) was used to analyze the crystalline structure of the particles, a Tecnai high-resolution transmission electron microscope (HR-TEM) was used to analyze the carbon layer in the particles, and a Leco elemental analyzer (EA) was used to quantitatively analyze an actual carbon layer.

Figure 2:
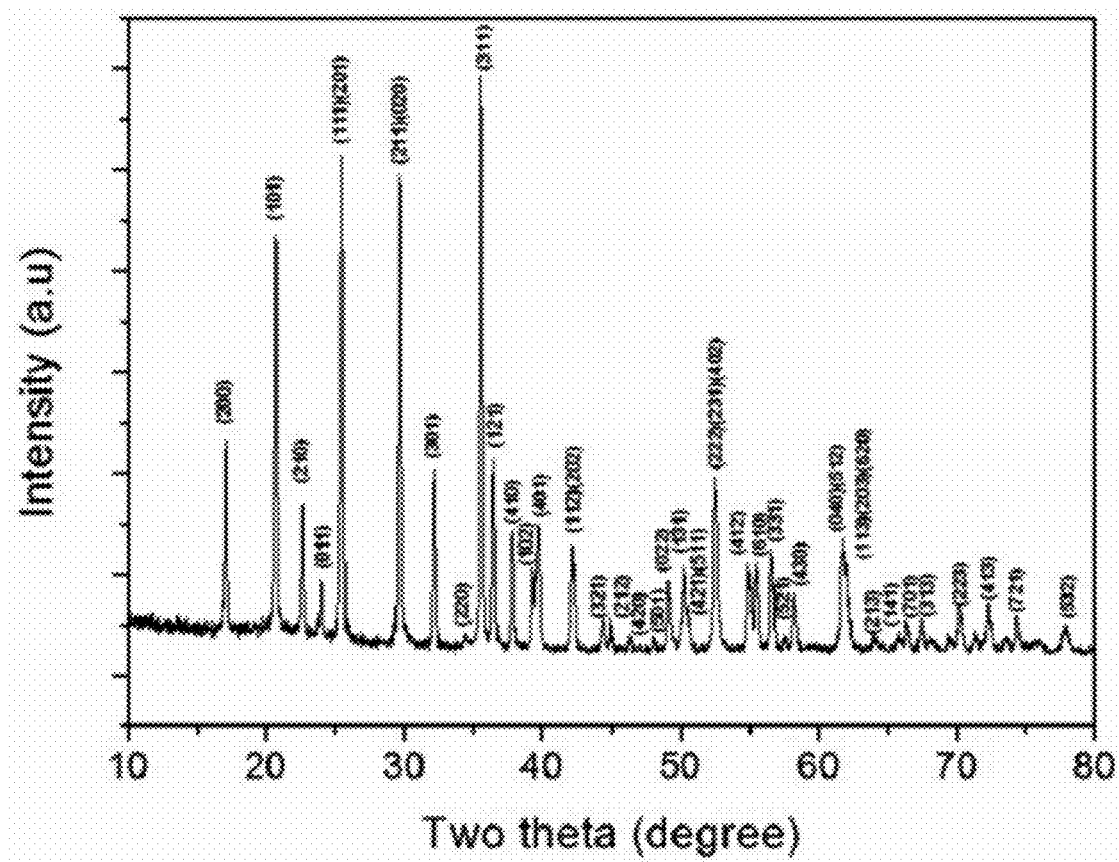
FIG. 2 is an XRD pattern graph of $LiFePO_4$ particles before carbon-coating according to Embodiment 1 of the present description.
Figure 3:
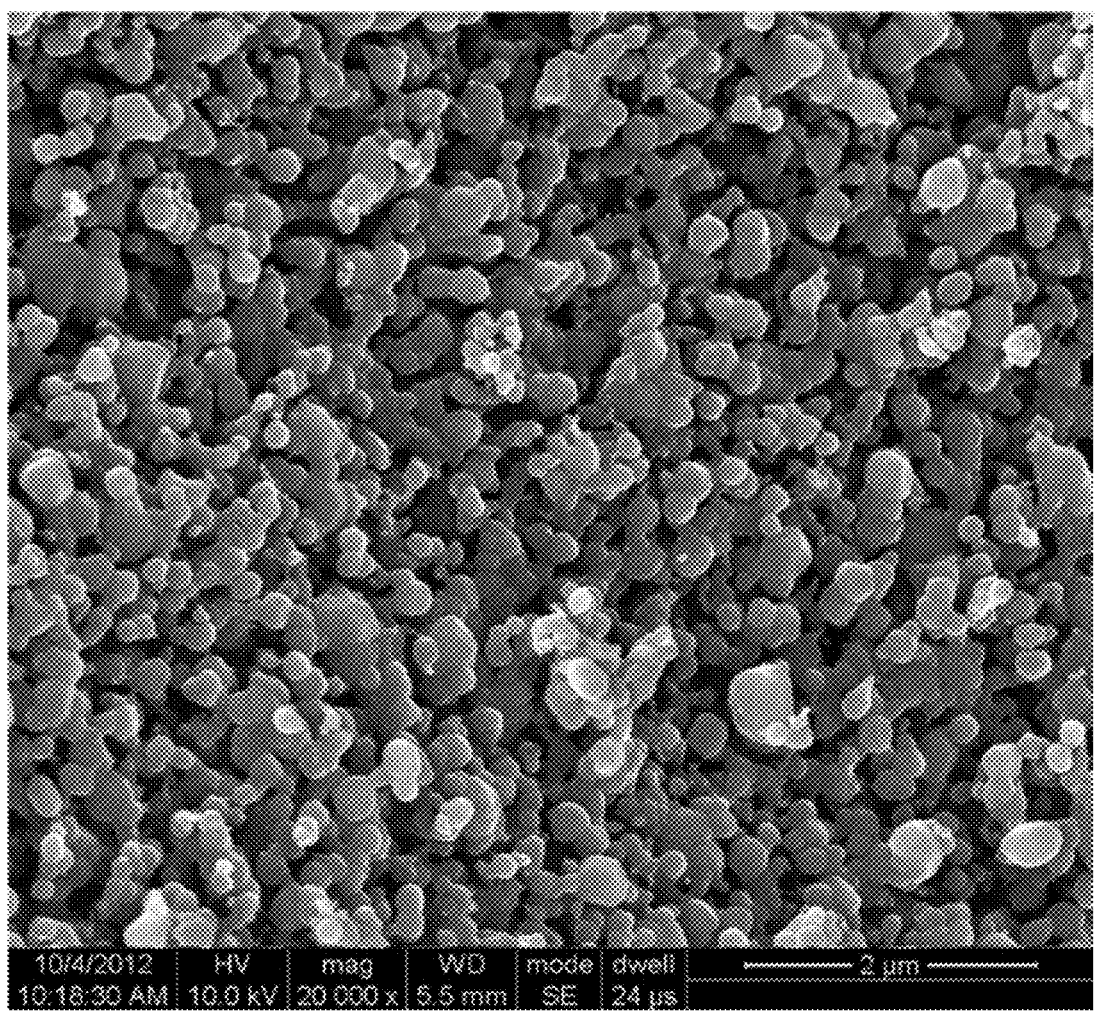
FIG. 3 is an SEM photograph of $LiFePO_4$ particles before carbon-coating according to Embodiment 1 of the present description.

FIG. 2 is an XRD pattern graph of LiFePO$_4$ particles before coating with carbon precursors in Embodiment 1, and FIG. 3 is an SEM photograph of LiFePO$_4$ particles before coating with carbon precursors in Embodiment 1.

Referring to FIGS. 2 and 3, the LiFePO$_4$ particles before coating with the carbon precursors have an olivine structure with high crystallinity and no impurities, particle sizes thereof are in the range of 100 nm to 300 nm, and existence of pores between particles is confirmed.

Figure 4:
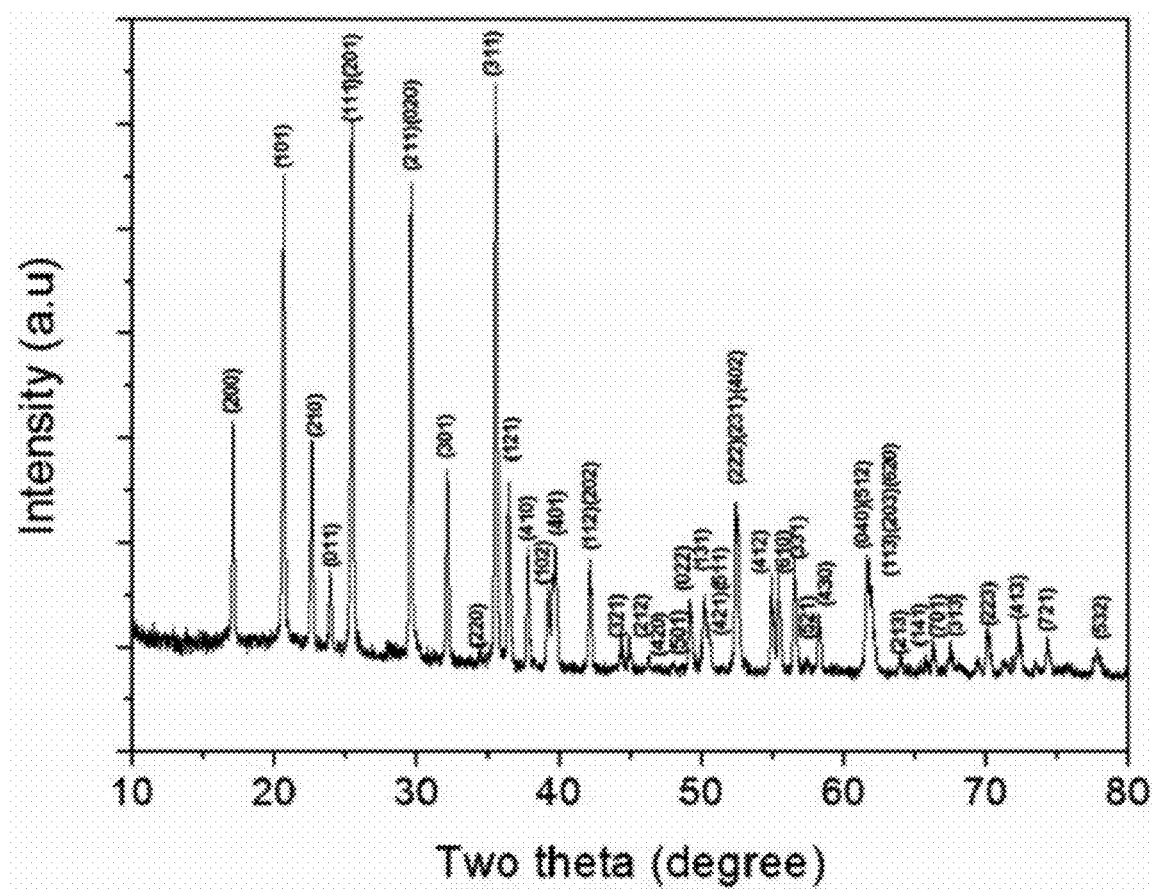
FIG. 4 is an XRD pattern graph of $LiFePO_4$ particles coated with carbon precursors according to Embodiment 1 of the present description.
Figure 5:
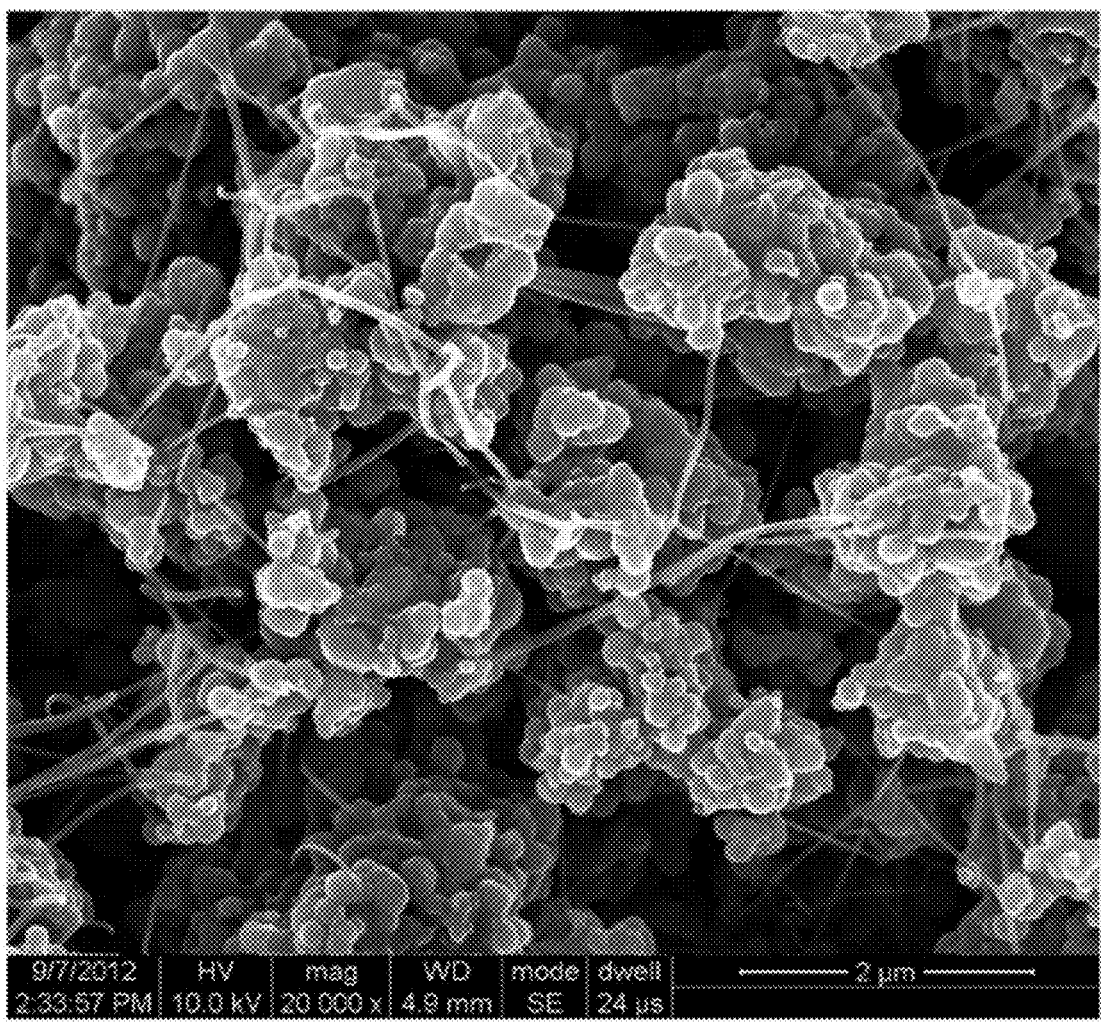
FIG. 5 is an SEM photograph of $LiFePO_4$ particles coated with carbon precursors according to Embodiment 1 of the present description.

FIG. 4 is an XRD pattern graph of LiFePO$_4$ particles coated with carbon precursors in Embodiment 1, and FIG. 5 is an SEM photograph of LiFePO$_4$ particles coated with carbon precursors in Embodiment 1.

Referring to FIGS. 4 and 5, the LiFePO$_4$ particles, even after coating with the carbon precursors, still have the olivine structure with high crystallinity and no impurities. In addition, the carbon precursors coating the LiFePO$_4$ particles have a nanotube shape having a diameter of 20 nm to 50 nm and a length of 1 µm to 5 µm, and the carbon precursors are tangled and spread between the LiFePO$_4$ particles.

Figure 6:
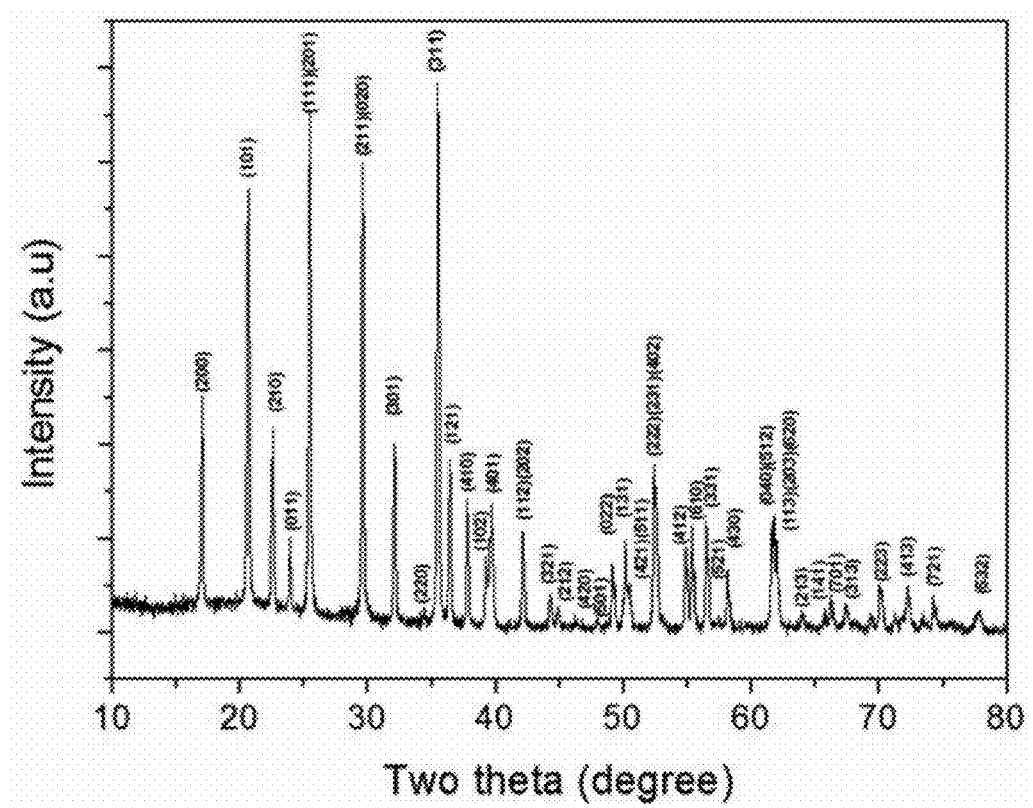
FIG. 6 is an XRD pattern graph of $LiFePO_4$ particles coated with carbon layers after sintering according to Embodiment 1 of the present description.
Figure 7:
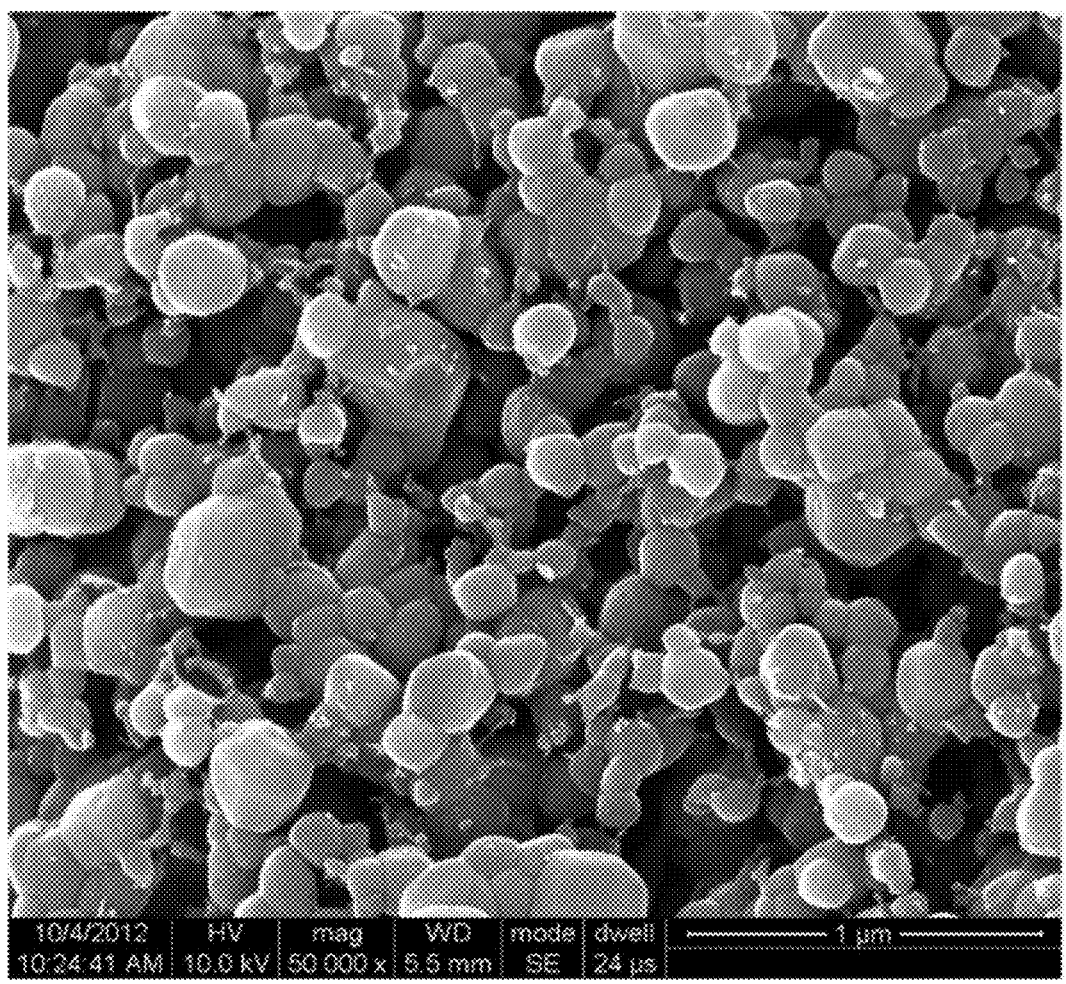
FIG. 7 is an SEM photograph of $LiFePO_4$ particles coated with carbon layers after sintering according to Embodiment 1 of the present description.

FIG. 6 is an XRD pattern graph of LiFePO$_4$ particles coated with carbon layers after sintering in Embodiment 1, and FIG. 7 is an SEM photograph of LiFePO$_4$ particles coated with carbon layers after sintering in Embodiment 1

Referring to FIGS. 6 and 7, the LiFePO$_4$ particles have an olivine structure with high crystallinity and no impurities even after the sintering process. In addition, the nanotube-shaped carbon precursors have been changed into the carbon layers by sintering. In particular, the LiFePO$_4$ particles coated with carbon layers have a similar shape to the LiFePO$_4$ particles before coating with the carbon precursors in FIG. 2. This implies that the carbon layers are uniformly formed.

Figure 8A:
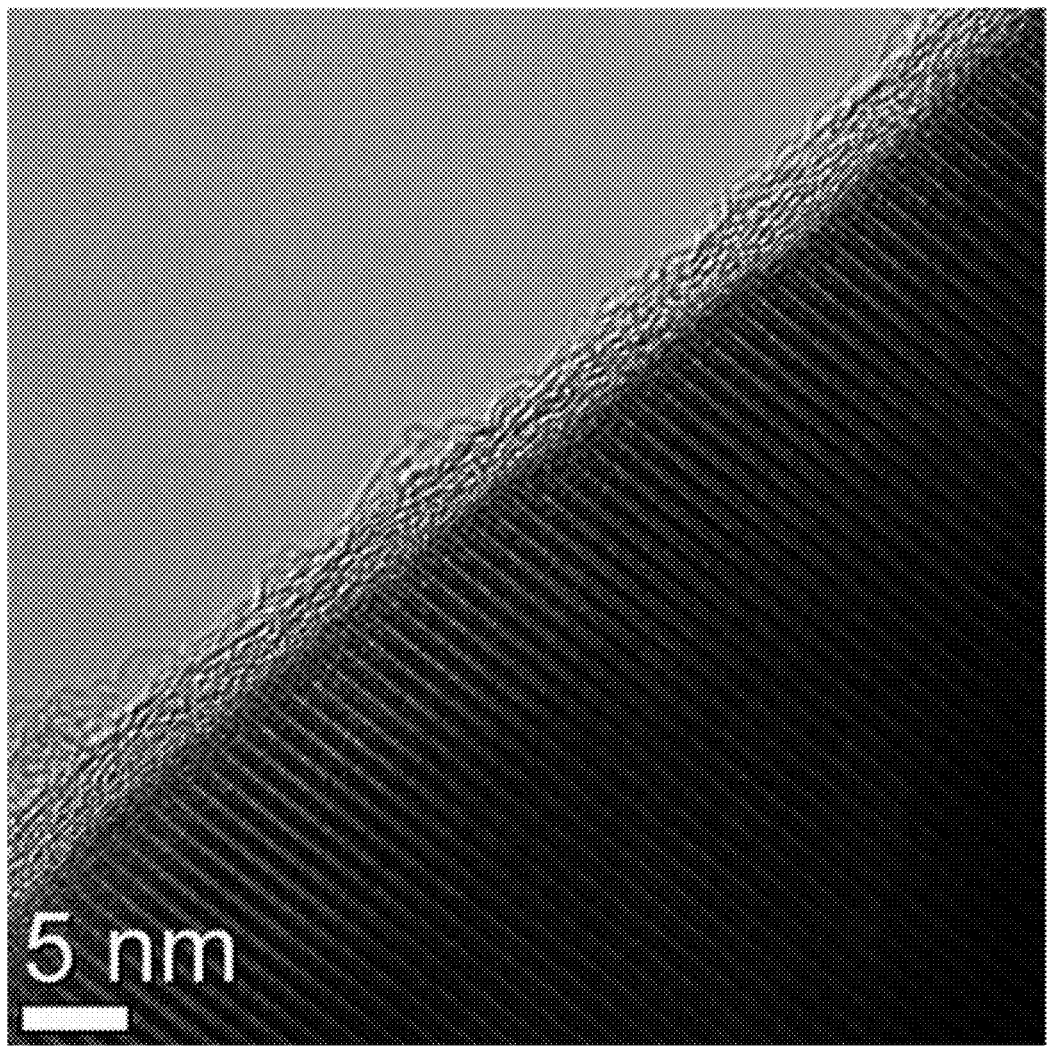
FIGS. 8A and 8B are HR-TEM photographs of $LiFePO_4$ particles coated with carbon layers after sintering according to Embodiment 1 of the present description.
Figure 8B:
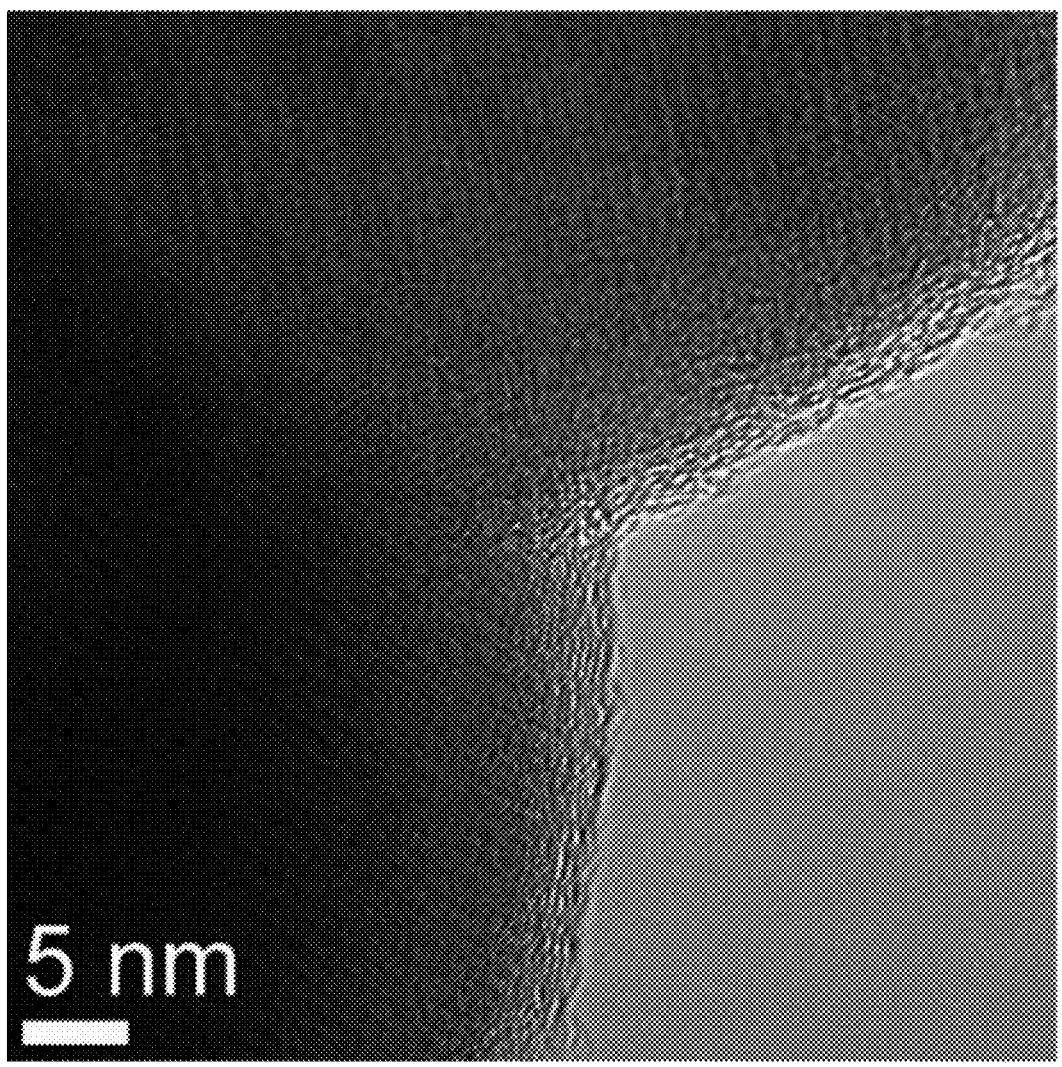

FIGS. 8A and 8B are HR-TEM photographs of LiFePO$_4$ particles coated with carbon layers after sintering in Embodiment 1, and it can be seen that surfaces of the LiFePO$_4$ particles have been uniformly coated with the carbon layers to a thickness of 3 nm to 5 nm. Meanwhile, the amount of carbon in the LiFePO$_4$ particles coated with carbon layers was analyzed by EA, and it was 1.9 wt %.

Figure 9:
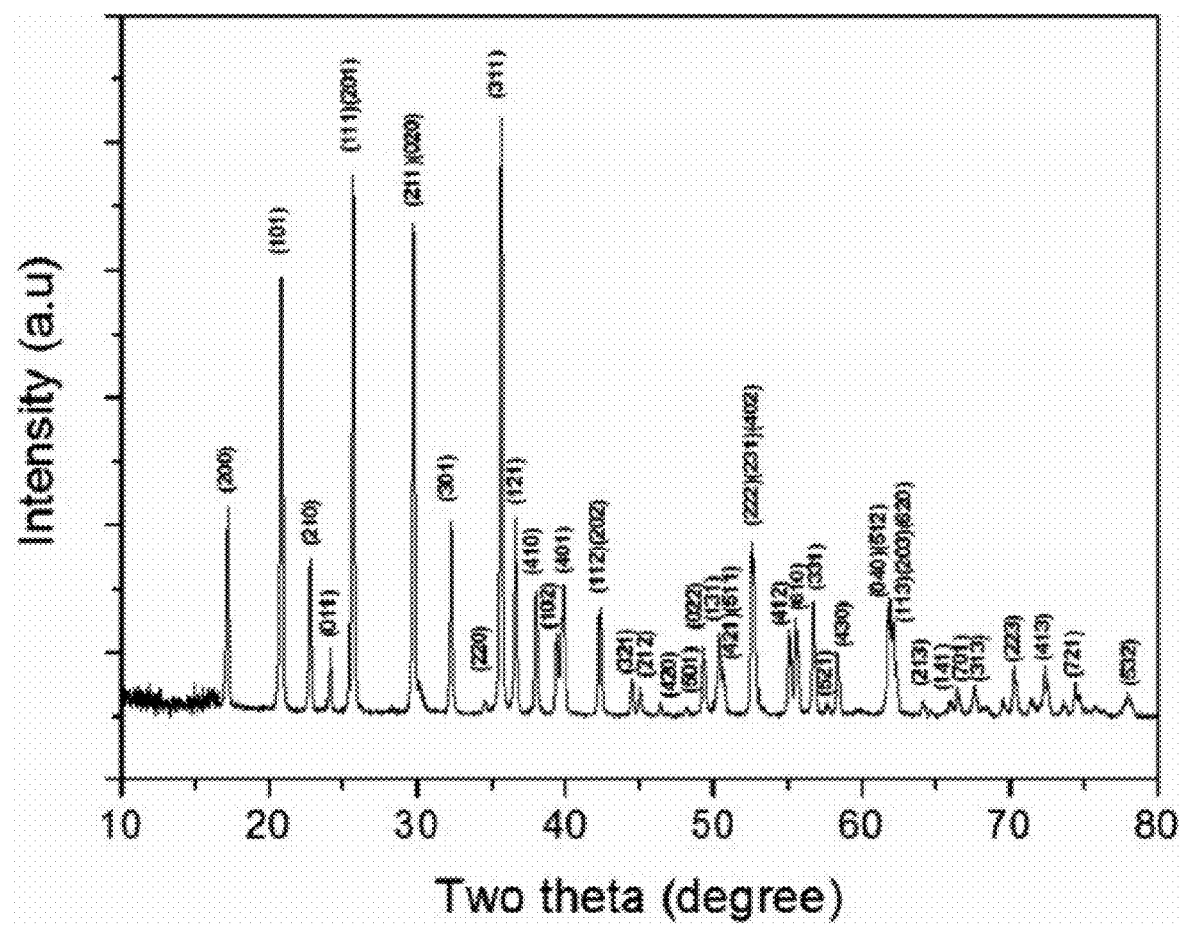
FIG. 9 is an XRD pattern graph of $LiFePO_4$ particles before carbon-coating according to Comparative Example 1 of the present description.
Figure 10:
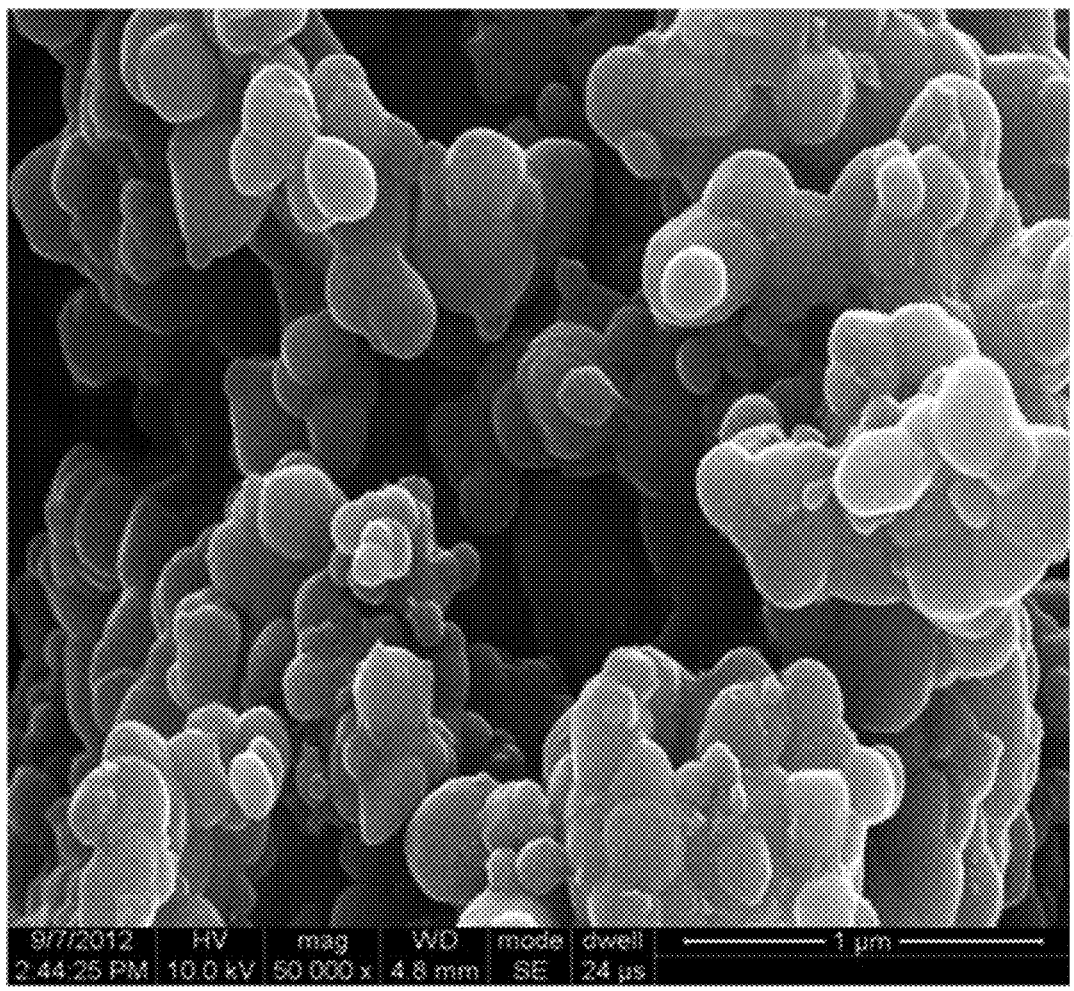
FIG. 10 is an SEM photograph of $LiFePO_4$ particles coated with carbon layers after sintering according to Comparative Example 1 of the present description.

FIG. 9 is an XRD pattern graph of LiFePO$_4$ particles before coating with carbon precursors in Comparative Example 1, and FIG. 10 is an SEM photograph of LiFePO$_4$ particles coated with carbon layers after sintering fabricated in Comparative Example 1.

Referring to FIGS. 9 and 10, the LiFePO$_4$ particles before coating with the carbon precursors have an olivine structure with the same crystallinity as the LiFePO$_4$ particles before coating with the carbon precursors according to Embodiment 1, and have a size and shape the same as or similar to the size and shape of the LiFePO$_4$ particles before coating with the carbon precursors according to Embodiment 1.

Figure 11A:
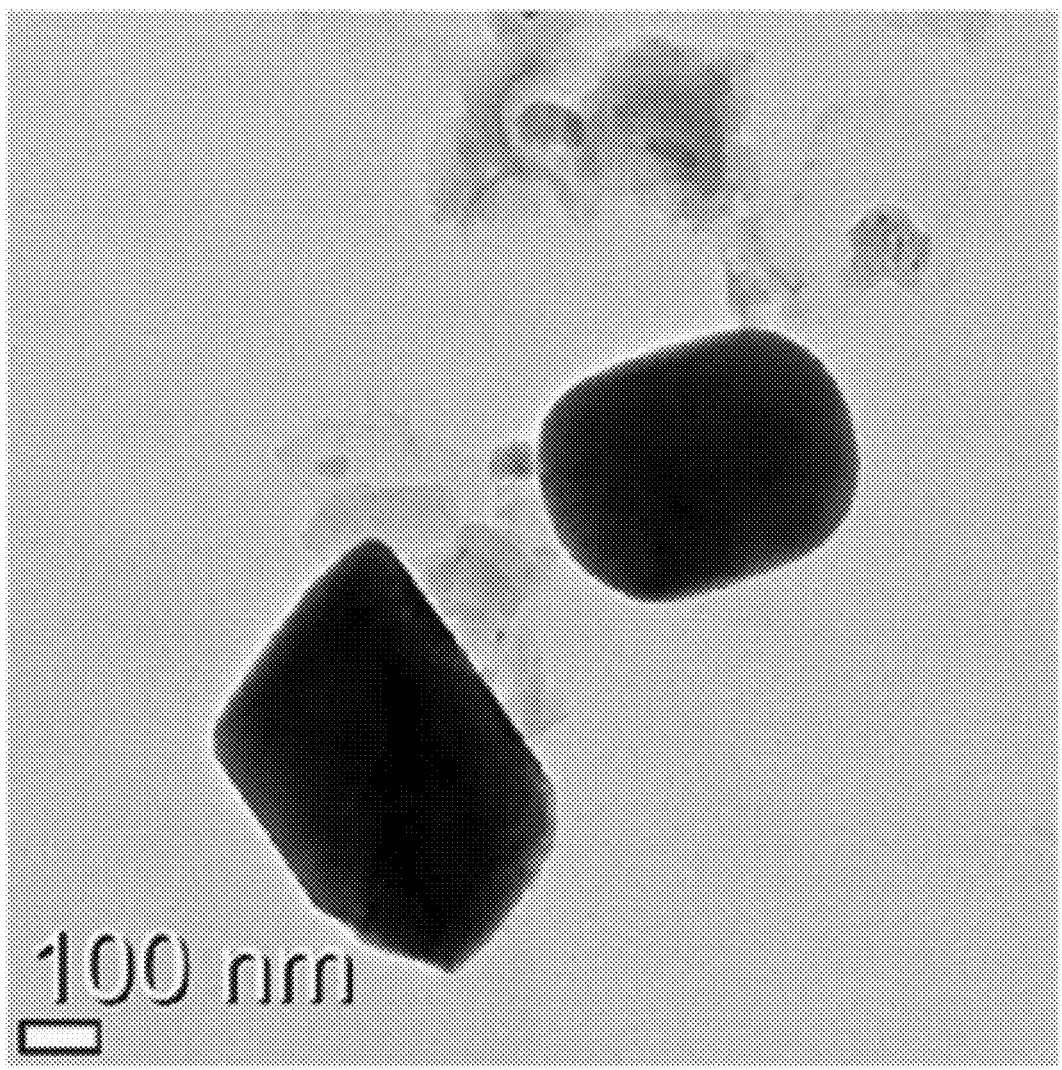
FIGS. 11A and 11B are HR-TEM photographs of $LiFePO_4$ particles coated with the carbon layers after sintering according to Comparative Example 1 of the present description.
Figure 11B:
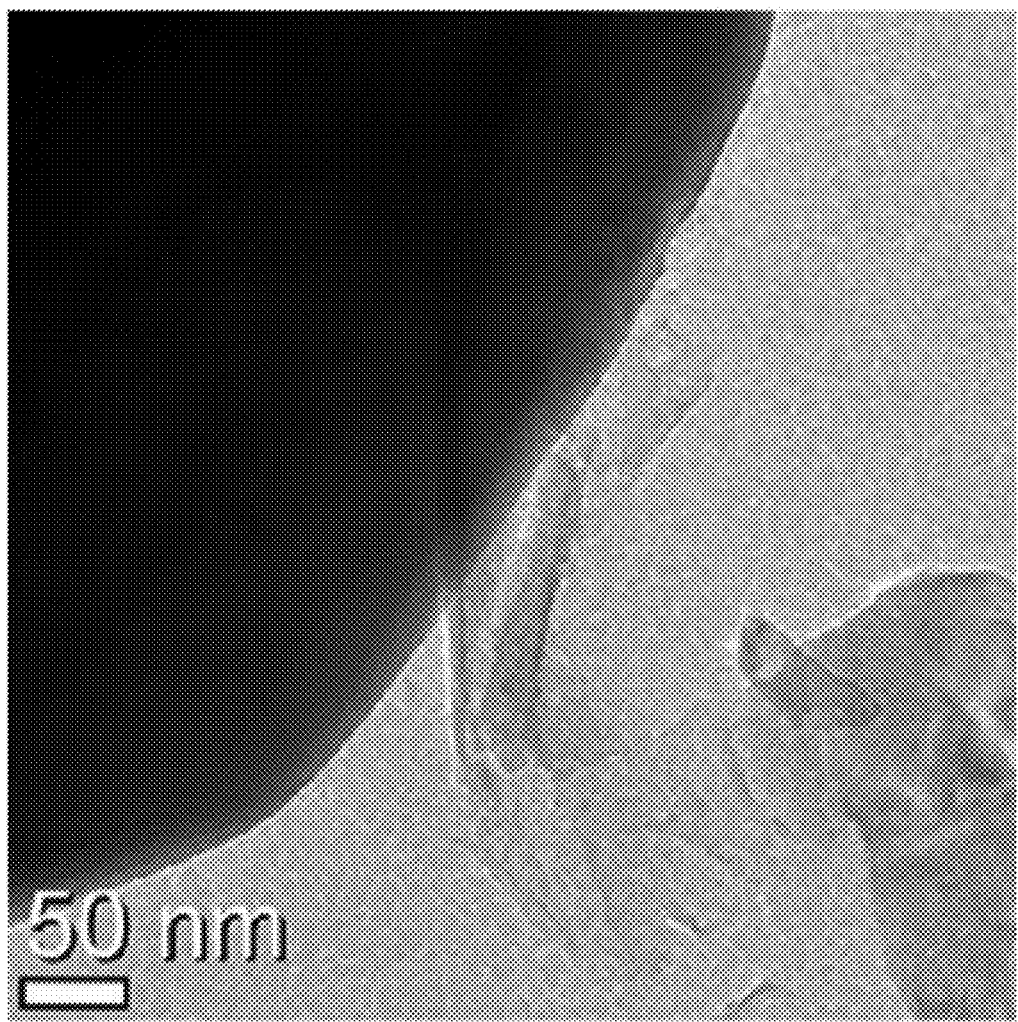

FIGS. 11A and 11B are HR-TEM photographs of LiFePO$_4$ particles coated with the carbon layers after sintering in Comparative Example 1.

A mass of carbon having a diameter of about 1 µm, which does not coat the LiFePO$_4$ particles, is observed and it is found that even the mass of carbon near the LiFePO$_4$ particles does not uniformly coat the LiFePO$_4$ particles. The amount of carbon in the LiFePO$_4$ particles coated with carbon layers was analyzed by EA, and it was 6.0 wt %.

Measurement of Discharge Capacity of Battery

Embodiment 5

In order to analyze electrochemical properties of secondary battery active material particles coated with carbon, a secondary battery was fabricated.

First, a cathode electrode was fabricated using the LiFePO$_4$ particles coated with carbon according to Embodiment 1 as a positive electrode active material, acetylene black as a conductive agent, and polyvinylidene fluoride as a binder. More specifically, in order to fabricate the cathode electrode, the active material, the conductive agent, and the binder were mixed at a weight ratio of 85:10:5 in an n-methyl pyrrolidone solvent to fabricate slurry. The slurry was applied on an aluminum foil in the form of a thin electrode plate having a thickness of 250 μm, and dried in an oven at a temperature of 80° C. for 6 hours or more.

Next, using a substance in which ethylene carbonate (EC), ethyl methyl carbonate (EMC), and diethyl carbonate (DEC) were mixed at a volume ratio of 1:1:1 and lithium phosphate hexafluoride (LiPF$_6$) was dissolved, as an electrolyte, a Li metal as a counter electrode, and the above-described cathode electrode, a coin-type half-cell was fabricated.

Charging/discharging characteristics and cyclability of the fabricated secondary battery were examined while changing a charging/discharging rate from 0.1 C to 30 C at a voltage from 2.5 to 4.3 V.

Embodiment 6

A secondary battery was fabricated using the same method as in Embodiment 5, except that the anode electrode was fabricated using Li$_4$Ti$_5$O$_{12}$ coated with carbon according to Embodiment 2 instead of Embodiment 1 as a cathode electrode active material, and using a copper foil instead of the aluminum foil. Charging/discharging characteristics and cyclability of the fabricated secondary battery were examined by the same method as Embodiment 5.

Embodiment 7

A secondary battery was fabricated using the same method as in Embodiment 5, except that the anode electrode was fabricated using TiO$_2$ coated with carbon according to Embodiment 3 instead of Embodiment 1 as a cathode electrode active material, and using a copper foil instead of the aluminum foil. Charging/discharging characteristics and cyclability of the fabricated secondary battery were examined by the same method as Embodiment 5.

Embodiment 8

A secondary battery was fabricated using the same method as in Embodiment 5, except that the cathode electrode was fabricated using Li$_2$FeSiO$_4$ coated with carbon according to Embodiment 4 instead of Embodiment 1 as a cathode electrode active material. Charging/discharging characteristics and cyclability of the fabricated secondary battery were examined by the same method as Embodiment 5.

Comparative Example 5

A secondary battery was fabricated using the same method as in Embodiment 5, except that the cathode electrode was fabricated using LiFePO$_4$ particles coated with carbon according to Comparative Example 1 instead of Embodiment 1 as a cathode electrode active material. Charging/discharging characteristics and cyclability of the fabricated secondary battery were examined by the same method as Embodiment 5.

Comparative Example 6

A secondary battery was fabricated using the same method as in Embodiment 5, except that the anode electrode was fabricated using Li$_4$Ti$_5$O$_{12}$ coated with carbon according to Comparative Example 2 instead of Embodiment 1 as a cathode electrode active material, and using a copper foil instead of the aluminum foil. Charging/discharging characteristics and cyclability of the fabricated secondary battery were examined by the same method as Embodiment 5.

Comparative Example 7

A secondary battery was fabricated using the same method as in Embodiment 5, except that the anode electrode was fabricated using TiO$_2$ coated with carbon according to Comparative Example 3 instead of Embodiment 1 as a cathode electrode active material, and using a copper foil instead of the aluminum foil. Charging/discharging characteristics and cyclability of the fabricated secondary battery were examined by the same method as Embodiment 5.

Comparative Example 8

A secondary battery was fabricated using the same method as in Embodiment 5, except that the cathode electrode was fabricated using Li$_2$FeSiO$_4$ coated with carbon according to Comparative Example 4 instead of Embodiment 1 as a cathode electrode active material. Charging/discharging characteristics and cyclability of the fabricated secondary battery were examined by the same method as Embodiment 5.

Experimental Example

Table 1 illustrates results of measuring discharge capacity of the secondary batteries fabricated according to Embodiment 5 to Embodiment 8 of the present description, and Comparative Example 5 to Comparative Example 8 after 10 cycles and 100 cycles at a rate of 0.1 C.

TABLE 1

| Division | Actual Amount of Carbon Measured by EA (wt %) | Discharging Capacity after 10 cycles at 0.1 C (mAh/g) | Discharging Capacity after 100 cycles at 0.1 C (mAh/g) | Discharging Capacity/Actual Amount of Carbon after 10 cycles at 0.1 C (mAh/g/wt %) | Discharging Capacity/Actual Amount of Carbon after 100 cycles at 0.1 C (mAh/g/wt %) |
|---|---|---|---|---|---|
| Embodiment 5 | 1.9 | 173 | 170 | 91.1 | 89.5 |
| Embodiment 6 | 1.8 | 174 | 173 | 96.7 | 96.1 |
| Embodiment 7 | 2.0 | 220 | 218 | 110 | 109 |
| Embodiment8 | 1.9 | 300 | 295 | 157.9 | 155.3 |
| Comparative | 6.0 | 148 | 135 | 24.7 | 22.5 |

TABLE 1-continued

| Division | Actual Amount of Carbon Measured by EA (wt %) | Discharging Capacity after 10 cycles at 0.1 C (mAh/g) | Discharging Capacity after 100 cycles at 0.1 C (mAh/g) | Discharging Capacity/Actual Amount of Carbon after 10 cycles at 0.1 C (mAh/g/wt %) | Discharging Capacity/Actual Amount of Carbon after 100 cycles at 0.1 C (mAh/g/wt %) |
|---|---|---|---|---|---|
| Example 5 Comparative Example 6 | 5.8 | 165 | 155 | 28.4 | 26.7 |
| Comparative Example 7 | 6.2 | 180 | 162 | 29.0 | 26.1 |
| Comparative Example 8 | 6.1 | 255 | 221 | 41.8 | 36.2 |

As listed in [Table 1], although the amount of carbon in the secondary batteries fabricated according to Embodiment 5 to Embodiment 8 of the present description is significantly lower than the amount of carbon in the secondary batteries fabricated according to Comparative Example 5 to Comparative Example 8, the former has high discharge capacity and undergoes small changes in the discharge capacity in accordance with the increase of charge/discharge cycles.

More specifically, when comparing the discharge capacity per unit mass of the secondary batteries fabricated according to Embodiment 5 to Embodiment 8 of the present description with that of the secondary batteries fabricated according to Comparative Example 5 to Comparative Example 8 by dividing the discharge capacity measured after 10 cycles at a rate of 0.1 C by the actual amount of carbon, it can be seen that the secondary batteries, active materials of which are coated with carbon using liquid carbon dioxide, fabricated according to Embodiment 5 to Embodiment 8 of the present description have remarkably excellent discharge capacity. In addition, when comparing the discharge capacity per unit mass of the secondary batteries fabricated according to Embodiment 5 to Embodiment 8 of the present description with that of the secondary batteries fabricated according to Comparative Example 5 to Comparative Example 8 by dividing the discharge capacity measured after 100 cycles at a rate of 0.1 C by the actual amount of carbon, it can also be seen that the secondary batteries, active materials of which are coated with carbon using liquid carbon dioxide, fabricated according to Embodiment 5 to Embodiment 8 of the present description have remarkably excellent discharge capacity.

Figure 12:
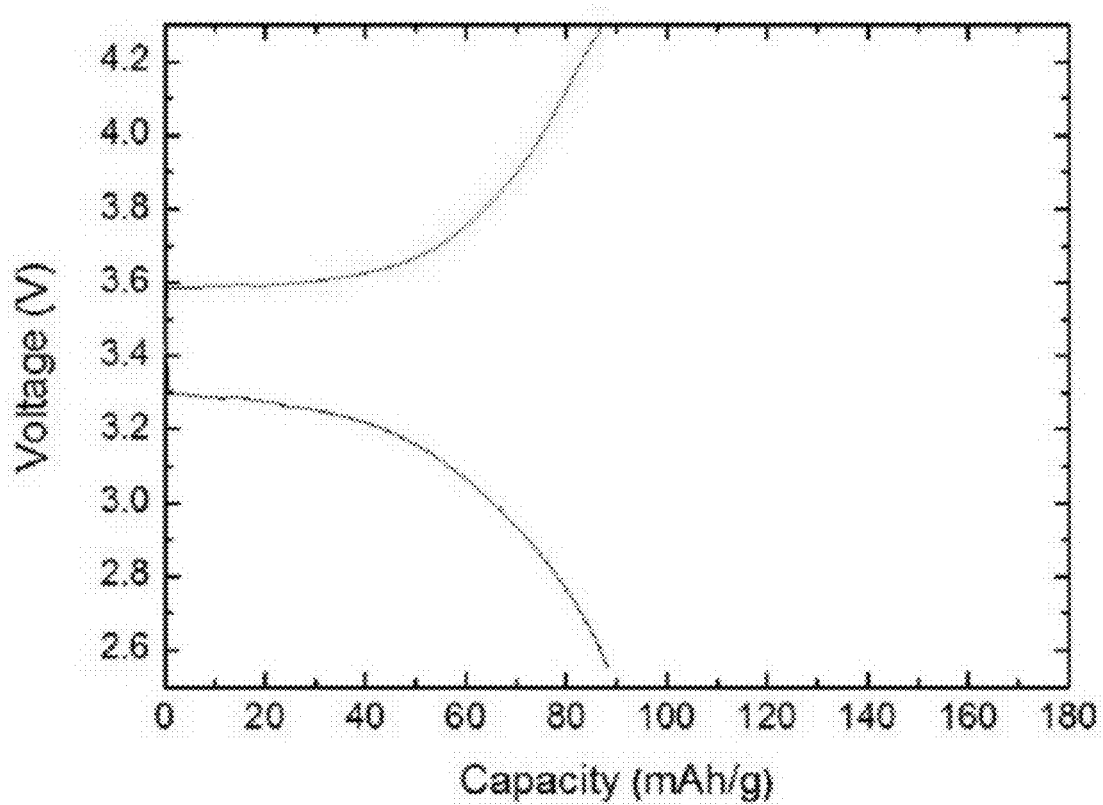
FIG. 12 is an initial charge/discharge curve graph of $LiFePO_4$ particles fabricated by a solid-phase method before carbon-coating.

FIG. 12 is an initial charge/discharge curve graph of $LiFePO_4$ particles fabricated by a solid-phase method before carbon-coating. The initial discharge capacity at the rate of 0.1 C is 90 mAh/g, which is significantly lower than 170 mAh/g, which is a theoretical discharge capacity of the $LiFePO_4$ particles.

Figure 13:
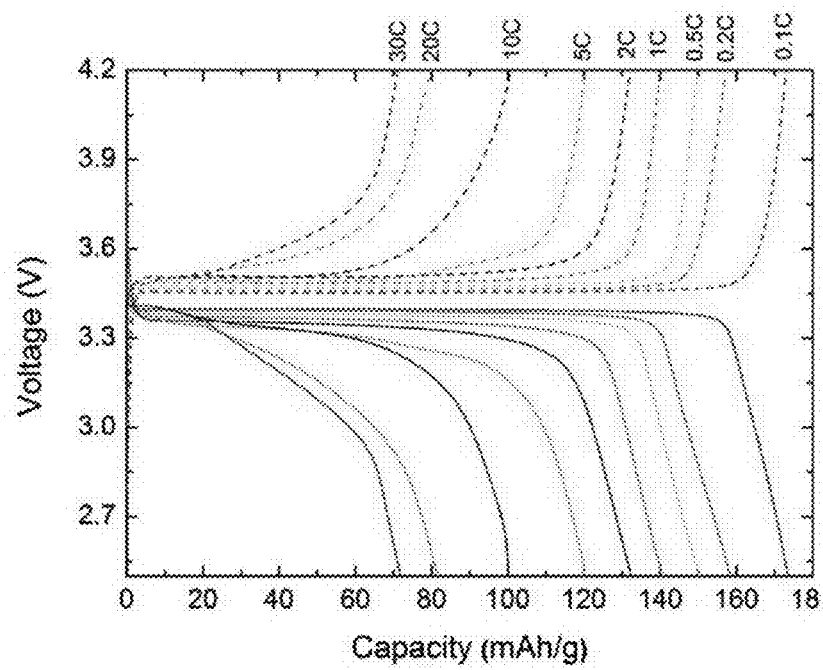
FIG. 13 is an initial charge/discharge curve graph of $LiFePO_4$ particles coated with carbon according to Embodiment 5 of the present description.

FIG. 13 is an initial charge/discharge curve graph of $LiFePO_4$ particles coated with carbon according to Embodiment 5 of the present description. The initial discharge capacity at a low charge/discharge rate of 0.1 C is 173.5 mAh/g, which is slightly higher than the theoretical discharge capacity of the $LiFePO_4$ particles. In addition, as the charge/discharge rate increases in the order of 0.2 C, 0.5 C, 1 C, 2 C, 5 C, 10 C, 20 C, and 30 C, the discharge capacity decreases in the order of 158 mAh/g, 150 mAh/g, 141 mAh/g, 133 mAh/g, 120 mAh/g, 100 mAh/g, 82 mAh/g, and 72 mAh/g.

Figure 14:
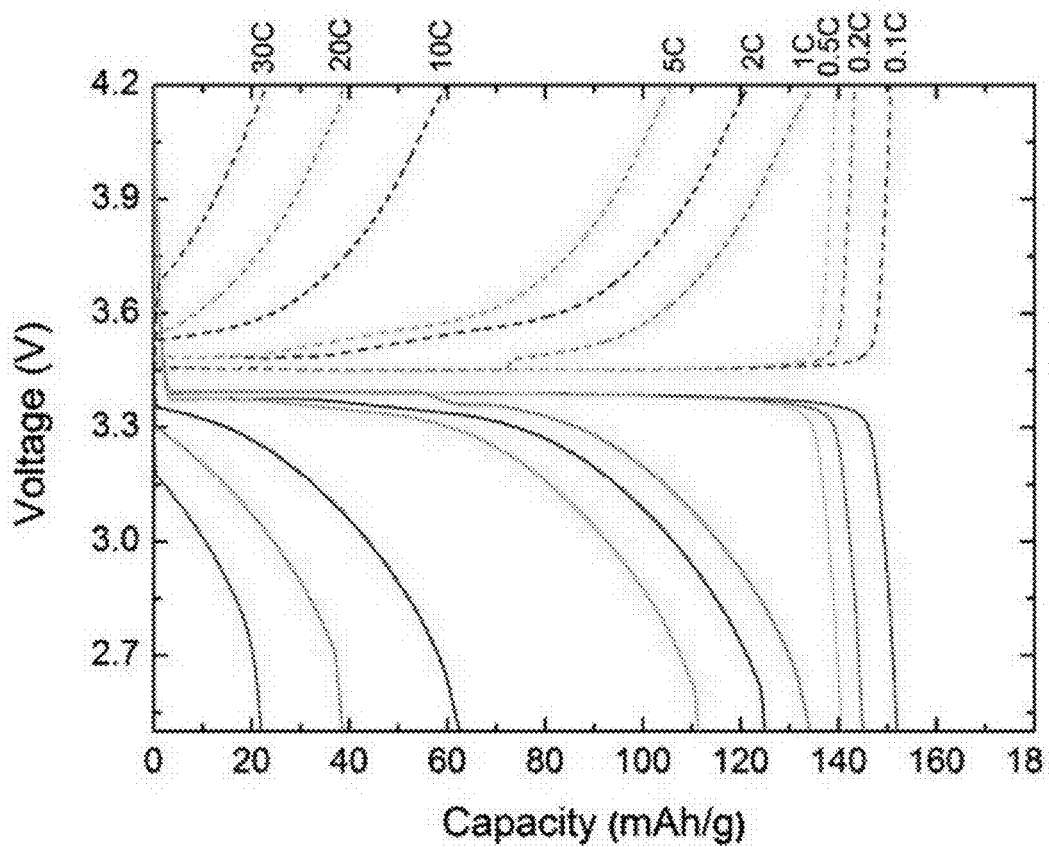
FIG. 14 is an initial charge/discharge curve graph of $LiFePO_4$ particles coated with carbon according to Comparative Example 5.

FIG. 14 an initial charge/discharge curve graph of $LiFePO_4$ particles coated with carbon according to Comparative Example 5. The initial discharge capacity is 152.0 mAh/g, which is significantly lower than the discharge capacity of the carbon-coated $LiFePO_4$ particles according to Embodiment 5 of the present description. In addition, as the charge/discharge rate increases in the order of 0.2 C, 0.5 C, 1 C, 2 C, 5 C, 10 C, 20 C, and 30 C, the discharge capacity decreases in the order of 145 mAh/g, 141 mAh/g, 134 mAh/g, 125 mAh/g, 111 mAh/g, 62 mAh/g, 39 mAh/g, and 22 mAh/g. That is, the discharge capacity of carbon-coated $LiFePO_4$ particles prepared according to Comparative Example 5 is significantly lower than that according to Embodiment 1 of the present description even at a high charge/discharge rate.

Figure 15:
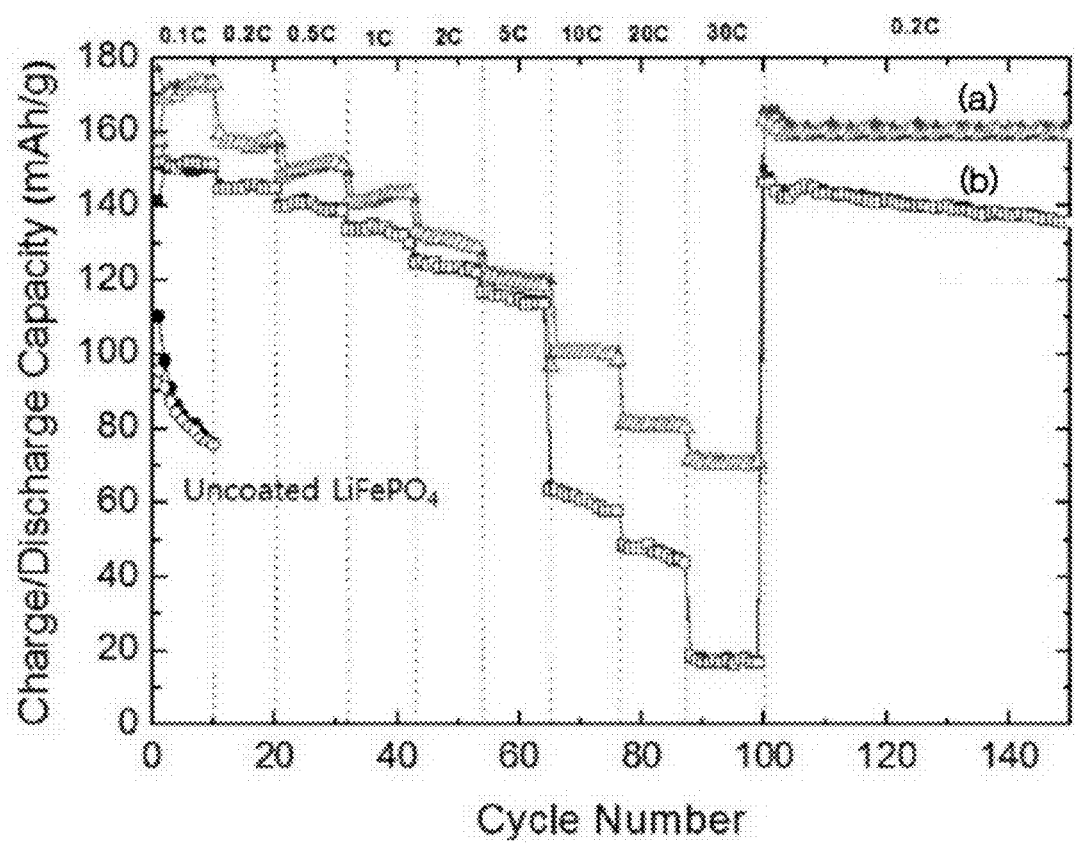
FIG. 15 is a graph illustrating the charge/discharge capacity according to the number of cycles of $LiFePO_4$ particles coated with carbon, wherein (a) represents the charge/discharge capacity according to the number of cycles of $LiFePO_4$ particles coated with carbon according to Embodiment 5, and (b) represents the charge/discharge capacity according to the number of cycles of $LiFePO_4$ particles coated with carbon according to Comparative Example 5.

In FIG. 15, (a) is a graph illustrating the charge/discharge capacity versus the number of cycles of $LiFePO_4$ particles coated with carbon according to Embodiment 5, and (b) is a graph illustrating the charge/discharge capacity versus the number of cycles of $LiFePO_4$ particles coated with carbon according to Comparative Example 5. Here, since $LiFePO_4$ particles which are not coated with the carbon layer have no carbon for improving electrical conductivity, the discharge capacity rapidly decreases from 90 mAh/g to 76 mAh/g after 10 cycles at 0.1 C.

In addition, Embodiment 5 shows excellent charge/discharge characteristics, that is, the initial charge/discharge capacity at 0.1 C is 174 mAh/g and the charge/discharge capacity after 10 cycles at 0.1 C is 173 mAh/g. On the contrary, Comparative Example 5 shows significantly low charge/discharge characteristics compared to Embodiment 5, that is, the initial charge/discharge capacity at 0.1 C is 151 mAh/g and the charge/discharge capacity after 10 cycles at 0.1 C is 148 mAh/g.

In addition, the discharge capacity in Embodiment 5 is maintained at 73 mAh/g at a high rate of 30 C and recovered to 167 mAh/g when the rate is reduced to 0.2 C, while the discharge capacity in Comparative Example 5 is 17 mAh/g at a high rate of 30 C, which is significantly low compared to the discharge capacity in Embodiment 5.

Meanwhile, in the secondary battery active material coated with carbon, the following experiments were performed in order to check the effect of the weight ratio of a carbon coating layer on the charge/discharge capacity of a secondary battery.

Embodiment 9

Surfaces of $LiFePO_4$ particles were coated with sucrose octaacetate by immersing the $LiFePO_4$ particles fabricated by a solid-phase method in a coating solution in which sucrose octaacetate was dissolved in liquid carbon dioxide for 30 minutes. Next, the LiFePO$_4$ particles coated with sucrose octaacetate were sintered in a furnace at 600° C. for 3 hours to form carbon layers on the surfaces of the LiFePO$_4$ particles. In this case, a weight ratio of the carbon coating layer with respect to the total weight of the LiFePO$_4$ particles coated with carbon was 0.9 wt %, measured by EA.

A cathode electrode was manufactured by using the LiFePO$_4$ particles coated with carbon, fabricated in the above-described manner, as a cathode electrode active material, acetylene black as a conductive agent, and polyvinylidene fluoride as a binder.

Next, using a substance in which EC, EMC, and DEC were mixed at a volume ratio of 1:1:1 and LiPF$_6$ was dissolved, as an electrolyte and a Li metal as a counter electrode, together with the above-described cathode electrode, a coin-type half-cell was fabricated.

Embodiment 10

A cathode electrode active material was fabricated using the same method as in Embodiment 9, except that a coating solution in which sucrose octaacetate was dissolved in liquid carbon dioxide at a concentration of about 20 wt % was used. Then, a secondary battery was manufactured using the cathode electrode active material by the same method as in Embodiment 9. In this case, a weight ratio of the carbon coating layer with respect to the total weight of the LiFePO$_4$ particles coated with carbon was 1.4 wt %, measured by EA.

Embodiment 11

A cathode electrode active material was fabricated using the same method as in Embodiment 9, except that a coating solution in which sucrose octaacetate was dissolved in liquid carbon dioxide at a concentration of about 30 wt % was used. Then, a secondary battery was manufactured using the cathode electrode active material by the same method as in Embodiment 9. In this case, a weight ratio of the carbon coating layer with respect to the total weight of the LiFePO$_4$ particles coated with carbon was 1.9 wt %, measured by EA.

Embodiment 12

A cathode electrode active material was fabricated using the same method as in Embodiment 9, except that a coating solution in which sucrose octaacetate was dissolved in liquid carbon dioxide at a concentration of about 40 wt % was used. Then, a secondary battery was manufactured using the cathode electrode active material by the same method as in Embodiment 9. In this case, a weight ratio of the carbon coating layer with respect to the total weight of the LiFePO$_4$ particles coated with carbon was 6.0 wt %, measured by EA.

Comparative Example 9

A secondary battery was manufactured using the same method as in Embodiment 9, except that a cathode electrode active material was formed by a solid-phase method and LiFePO$_4$ particles without being coated with carbon.

Experimental Example

Figure 16:
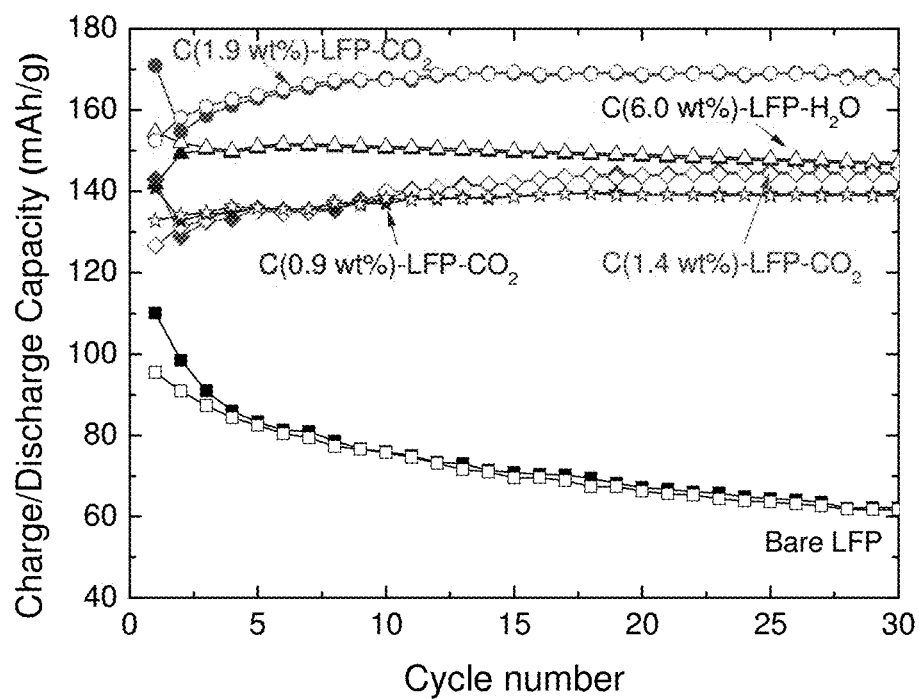
FIG. 16 is a graph for describing changes in charge/discharge capacity according to the weight ratio of a carbon coating layer.

FIG. 16 is a graph for describing changes in charge/discharge capacity according to the weight ratio of a carbon coating layer.

Referring to FIG. 16, the secondary batteries manufactured according to Embodiment 9 to Embodiment 12, as compared to Comparative Example 9, have a remarkably high charge/discharge capacity and undergo significantly smaller changes in discharge capacity in accordance with the increase of charge/discharge cycles.

In addition, in Embodiment 9 to Embodiment 12, when the weight ratio of the carbon layer is 1.9 wt % (Embodiment 11), the highest charge/discharge capacity is shown. More specifically, the charge/discharge capacity is relatively low (about 140 mAh/g) when the weight ratios of the carbon layer are 0.9 wt % and 1.4 wt %, while the charge/discharge capacity is relatively high (about 170 mAh/g) when the weight ratio of the carbon layer is increased to 1.9 wt %. However, the charge/discharge capacity may again be decreased (150 mAh/g) when weight ratio of the carbon layer is increased to 6.0 wt %.

In summary, in order to obtain high charge/discharge capacity in the secondary battery active material coated with carbon, the weight ratio of the carbon layer may be, for example, about 1.6 to 5 wt %.

Figure 17:
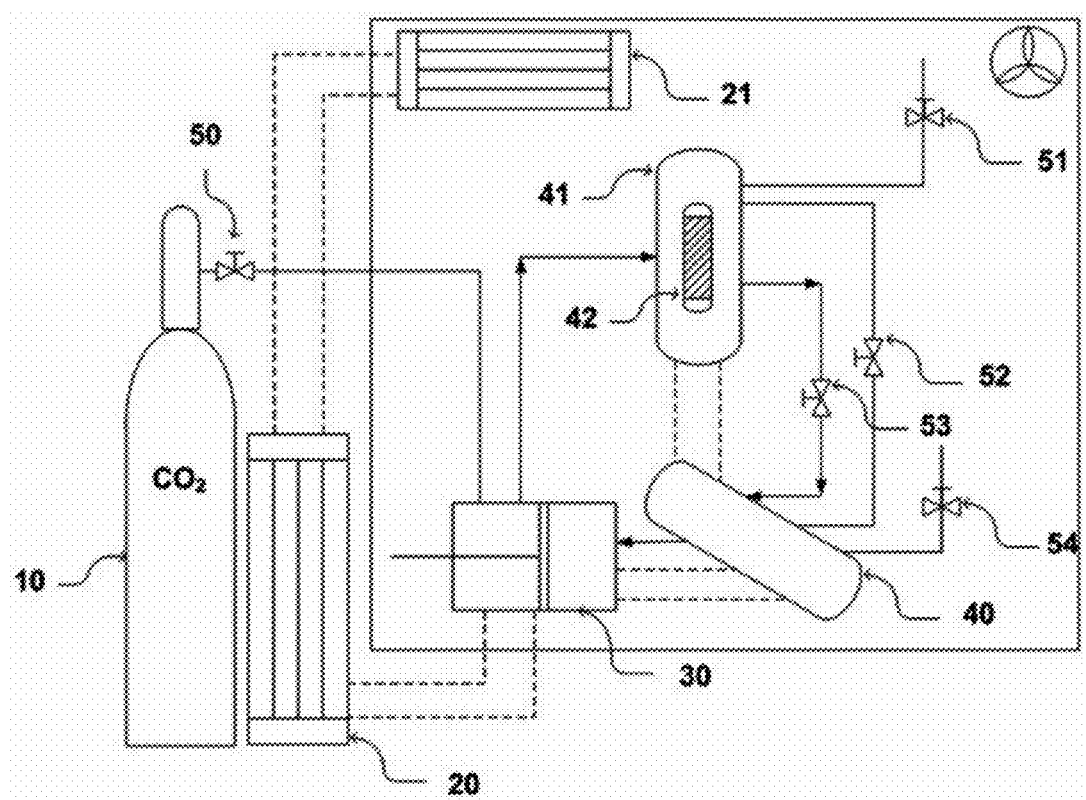
FIG. 17 illustrates a device for carbon-coating a secondary battery active material using liquid carbon dioxide according to an example of the present description.

FIG. 17 illustrates an apparatus for carbon-coating a secondary battery active material using a liquid carbon dioxide according to an embodiment of the present description.

Referring to FIG. 17, carbon precursors are introduced in a high-pressure solution vessel 40 and a temperature of the high-pressure solution vessel 40 is appropriately controlled using temperature controllers 20 and 21. Then, liquid carbon dioxide is introduced in the high-pressure solution vessel 40 and mixed with the carbon precursors using a magnetic bar so that the carbon precursors are sufficiently dissolved in the liquid carbon dioxide to form a precursor solution.

A secondary battery active material in a mesh 42 is introduced in a high-pressure coating vessel 41, and a pressure is applied to the secondary battery active material by introducing gaseous carbon dioxide in the high-pressure coating vessel 41.

After a first flow control valve 52 is opened to form a flow of gaseous carbon dioxide in the high-pressure coating vessel 41, the precursor solution in the high-pressure solution vessel 40 is transferred into the high-pressure coating vessel 41 containing the secondary battery active material. A second flow control valve 53 is controlled to gradually flow the liquid carbon dioxide solution back into the high-pressure container 40 after a sufficient time is passed so that surfaces of secondary battery active material are fully immersed in the precursor solution. Next, the gaseous carbon dioxide remaining in the high pressure coating vessel 41 is slowly evacuated using a third flow control valve 51.

The secondary battery active material particles coated with the carbon precursors are collected from the high pressure coating vessel 41, and sintered to form a carbon layer. Accordingly, a lithium secondary battery active material having excellent electrical conductivity and charge/discharge characteristics may be manufactured.

According to the embodiment of the present description, a carbon coating layer may be uniformly formed on a surface of a secondary battery active material by dissolving a carbon precursor in liquid carbon dioxide having excellent solubility in an organic material and low surface tension and low viscosity, coating the surface of the secondary battery active material with the carbon precursor using the liquid carbon dioxide, and performing a heat treatment to transform the carbon precursor coating on the secondary battery active material to the carbon layer. Since liquid carbon dioxide easily penetrates micro-pores between nano-sized particles of the secondary battery active material, the entire surface of the secondary battery active material can be uniformly coated with even using a small amount of carbon precursor.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of producing a carbon-coated secondary battery active material, comprising:
   forming a coating solution comprising a carbon precursor dissolved in liquid carbon dioxide;
   coating a surface of a secondary battery active material with the carbon precursor by immersing the secondary battery active material in the coating solution; and
   sintering the secondary battery active material coated with the carbon precursor to transform the carbon precursor to a carbon coating layer,
   wherein the sintering of the secondary battery active material is performed in an atmosphere comprising a hydrocarbon gas.

2. The method of claim 1, further comprising removing the liquid carbon dioxide after coating the secondary battery active material with the carbon precursor and before sintering the secondary battery active material coated with the carbon precursor.

3. The method of claim 1, wherein the carbon precursor comprises at least one selected from the group consisting of sucrose octaacetate, fluorinated hydrocarbons, polyethylene glycol, acrylic acid, methacrylic acid, acrylamide, vinyl pyrrolidone, glycidyl methacrylate, and styrene.

4. The method of claim 3, wherein the carbon precursor comprises at least one functional group selected from the group consisting of a carboxyl group, a hydroxyl group, an epoxy group, an ester group, a thiol group, and a sulfonic group.

5. The method of claim 3, wherein a concentration of the carbon precursor in the coating solution is in a range of 5 to 40 wt %.

6. The method of claim 3, wherein the coating solution is formed at a temperature of 0 to 30° C. under a pressure of 30 to 200 bar.

7. The method of claim 6, wherein the coating of the secondary battery active material is performed under a pressure of 30 to 200 bar.

8. The method of claim 1, wherein the sintering of the secondary battery active material is performed at a temperature of 200 to 800° C. for 1 to 3 hours.

9. The method of claim 8, wherein the sintering of the secondary battery active material is performed in an atmosphere comprising one or more gases selected from a group consisting of hydrogen, helium, neon, argon, krypton, xenon, and radon.

10. The method of claim 8, wherein the secondary battery active material comprises at least one selected from the group consisting of titanium dioxide, a compound represented by Formula 1, a compound represented by Formula 2, and a compound represented by Formula 3, wherein:
    Formula 1 is $LiMPO_4$, where M is one of manganese (Mn), iron (Fe), cobalt (Co), and nickel (Ni);
    Formula 2 is $Li_2NSiO_4$, where N is iron (Fe) or manganese (Mn); and
    Formula 3 is $Li_4Ti_5O_{12}$.

11. The method of claim 10, wherein the secondary battery active material before sintering comprises at least one amorphous portion, and
    the amorphous portion is changed to a crystalline portion during the sintering of the secondary battery active material.

12. The method of claim 1, where a viscosity of liquid carbon dioxide is 0.1 centipoise at room temperature.

13. The method of claim 1, wherein a weight ratio of carbon forming the carbon coating layer to a total weight of the secondary battery active material with carbon is 1.6 wt % to 5 wt %.

14. The method of claim 1, further comprising separating the secondary battery active material with the carbon precursor from the carbon precursor that is not coated on the surface of the secondary battery active material but remaining in liquid carbon dioxide.

15. A method of producing a carbon-coated secondary battery active material, comprising:
    forming a coating solution comprising a carbon precursor dissolved in liquid carbon dioxide;
    coating a surface of a secondary battery active material with the carbon precursor by immersing the secondary battery active material in the coating solution; and
    sintering the secondary battery active material coated with the carbon precursor to transform the carbon precursor to a carbon coating layer,
    wherein the carbon precursor comprises at least one selected from the group consisting of sucrose octaacetate, polyethylene glycol, acrylic acid, methacrylic acid, acrylamide, vinyl pyrrolidone, glycidyl methacrylate, and styrene.

16. A method of producing a carbon-coated secondary battery active material, comprising:
    forming a coating solution comprising a carbon precursor dissolved in liquid carbon dioxide;
    coating a surface of a secondary battery active material with the carbon precursor by immersing the secondary battery active material in the coating solution; and
    sintering the secondary battery active material coated with the carbon precursor to transform the carbon precursor to a carbon coating layer,
    wherein the carbon precursor comprises at least one functional group selected from the group consisting of a carboxyl group, a hydroxyl group, an epoxy group, a thiol group, and a sulfonic group.

* * * * *